United States Patent
Hou

(10) Patent No.: US 9,133,034 B2
(45) Date of Patent: Sep. 15, 2015

(54) CHELATING AGENT MODIFIED GRAPHENE OXIDES, METHODS OF PREPARATION AND USE

(76) Inventor: Shifeng Hou, Pine Brook, NJ (US)

(*) Notice: Subject to any disclaimer, the term of this patent is extended or adjusted under 35 U.S.C. 154(b) by 340 days.

(21) Appl. No.: 13/536,040

(22) Filed: Jun. 28, 2012

(65) Prior Publication Data

US 2012/0330044 A1    Dec. 27, 2012

Related U.S. Application Data

(63) Continuation-in-part of application No. PCT/US2010/061796, filed on Dec. 22, 2010.

(60) Provisional application No. 61/282,197, filed on Dec. 29, 2009.

(51) Int. Cl.
| C07F 7/10 | (2006.01) |
| C01B 31/04 | (2006.01) |
| B82Y 30/00 | (2011.01) |
| B82Y 40/00 | (2011.01) |
| B01J 45/00 | (2006.01) |

(52) U.S. Cl.
CPC .............. *C01B 31/043* (2013.01); *B01J 45/00* (2013.01); *B82Y 30/00* (2013.01); *B82Y 40/00* (2013.01); *C01B 31/0484* (2013.01); *Y02W 10/37* (2015.05); *Y10T 29/49108* (2015.01)

(58) Field of Classification Search
CPC ........ C07F 7/10; H01M 10/0525; C02F 1/64; C02F 1/28; C02F 1/62; B01J 45/00
USPC ............... 556/418, 9; 210/618, 688; 29/623.1
See application file for complete search history.

(56) References Cited

U.S. PATENT DOCUMENTS

2005/0227075 A1    10/2005 Bringley

FOREIGN PATENT DOCUMENTS

| WO | WO 2008055371 A2 * | 5/2008 |
| WO | WO2008055371 A2 * | 5/2008 |

OTHER PUBLICATIONS

Matsuo et al.,"Introduction of amino groups into the interlayer space of graphite oxide using 3-aminopropylethoxysilanes," Carbon, vol. 45, Issue 7, Jun. 2007, pp. 1384-1390.
Stankovich et al., "Synthesis and exfoliation of isocyanate-treated graphene oxide nanoplatelet," Carbon 44, Aug. 4, 2006, 3342-3347.
Dreyer et al., "The chemistry of graphene oxide," Chem. Soc. Rev., 39, 228-240, Nov. 3, 2009.
Dong et al., "Graphene-supported platinum and platinum-ruthenium nanoparticles with high electrocatalytic activity for methanol and ethanol oxidation," Carbon. 2010; 48: 781-787.
The Chinese Office Action, issued on Apr. 3, 2014, in the corresponding Chinese Application No. 201080059630.6.
The International Search Report and Written Opinion, issued on Feb. 28, 2011, in the corresponding PCT Application No. PCT/US2010/061796.
Wang et al., "Self-Assembled TiO2—Graphene Hybrid Nanostructures for Enhanced Li-Ion Insertion," ACS Nano, 2009, 3 (4), 907-914.
Hou et al.,"Formation of highly stable dispersions of silane-functionalized reduced graphene oxide," Chemical Physics Letters, vol. 501, Issues 1-3, Dec. 6, 2010, pp. 68-74.

* cited by examiner

*Primary Examiner* — Porfirio Nazario Gonzalez
*Assistant Examiner* — Kofi Adzamli
(74) *Attorney, Agent, or Firm* — Lance Liu

(57) ABSTRACT

The invention is directed to chelating agent modified graphene oxides having the following formula $G(AB)_x$; wherein G is graphene oxide, A is selected from the group consisting of $-(CH_2)_m-$, $-NH-$, $-S-$, $-O-S_i(-OR^1)_2(-CH_2)_m-$, $-C(=O)-$, $-C(=O)-O-$, $-C(=O)-O(CH_2)_m-$, $-C(=O)-NH-$, $-C(=O)-NH-(CH_2)_m-$, $-P(=O)_2-O-$, wherein m is 1-12 and $R^1$ is H, or $C_1$-$C_{12}$ alkyl; and B is a chelating moiety; wherein the ratio of basic graphene oxide units:x is from about 1:0.00001 to about 1:0.5. Such chelating modified graphene oxides have broad applications in diverse technical fields.

22 Claims, 15 Drawing Sheets

FIGURE 2
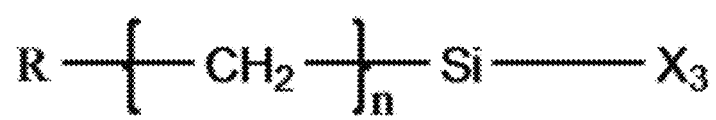
Silane with General Functional Groups
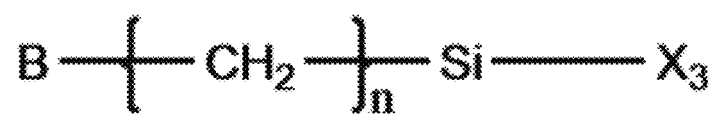
Silane with Chelating Groups N-(trimethoxysilylpropyl)
ethylenediamine triacetic
acid
(EDTA-Silane)

N-(trimethoxysilylpropyl)
ethylenediamine triacetic
acid tri sodium salt
(EDTA-Silane)

FIGURE 4
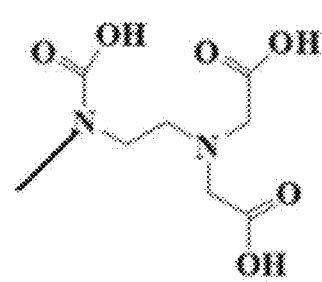
ethylene diamine triacetic acid
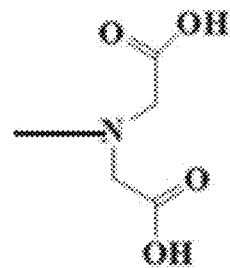
Nitrilo-diacetic acid
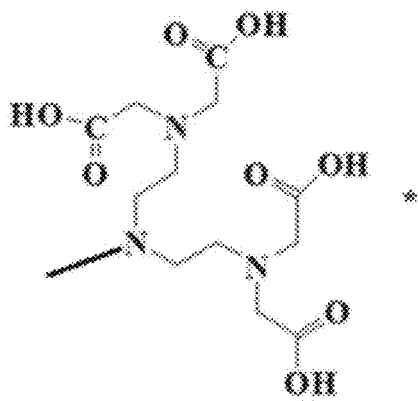
Diethylene triamine tetra acetic acid
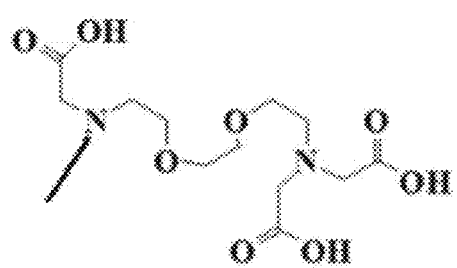
ethylene glycol triacetic acid FIGURE 10
Figure 10(a)
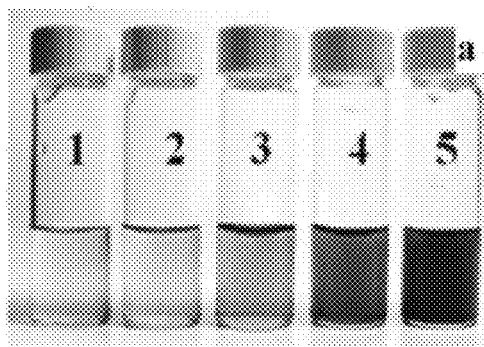
Figure 10(b)
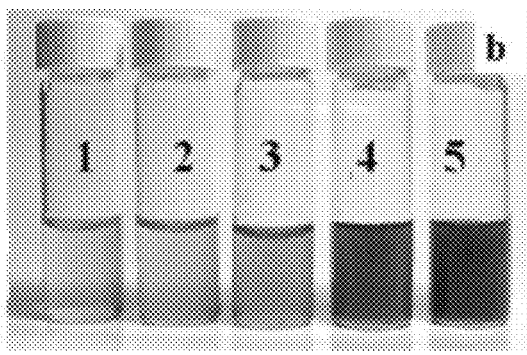
Figure 10(c)
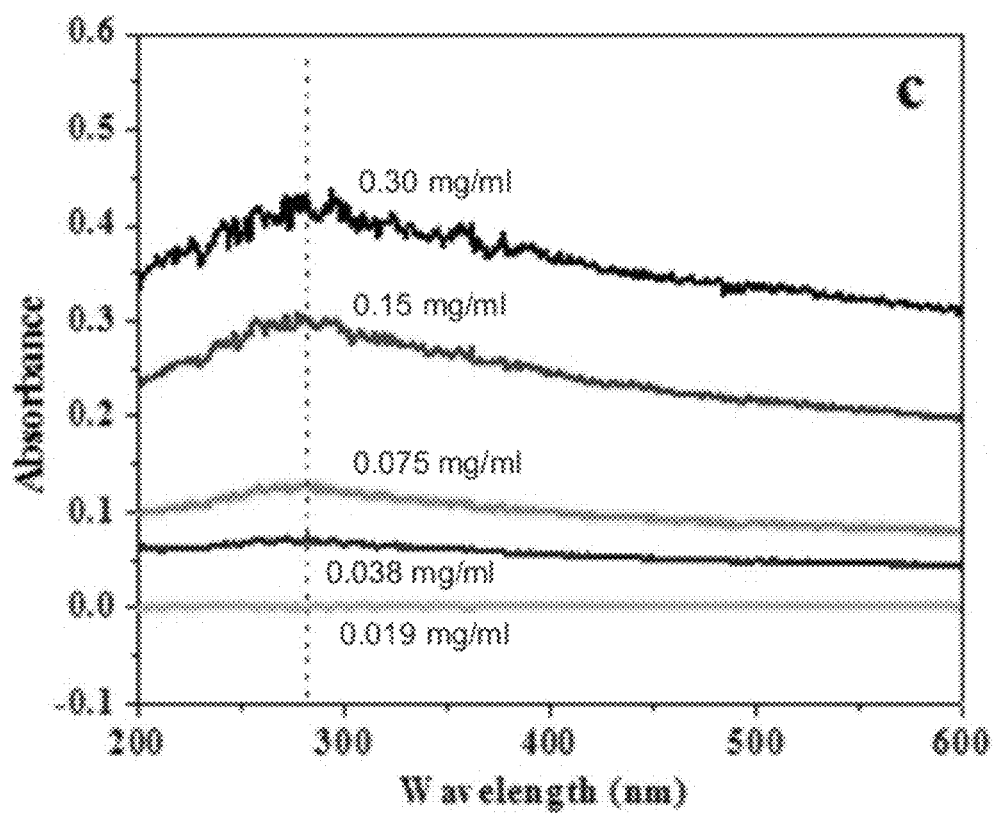

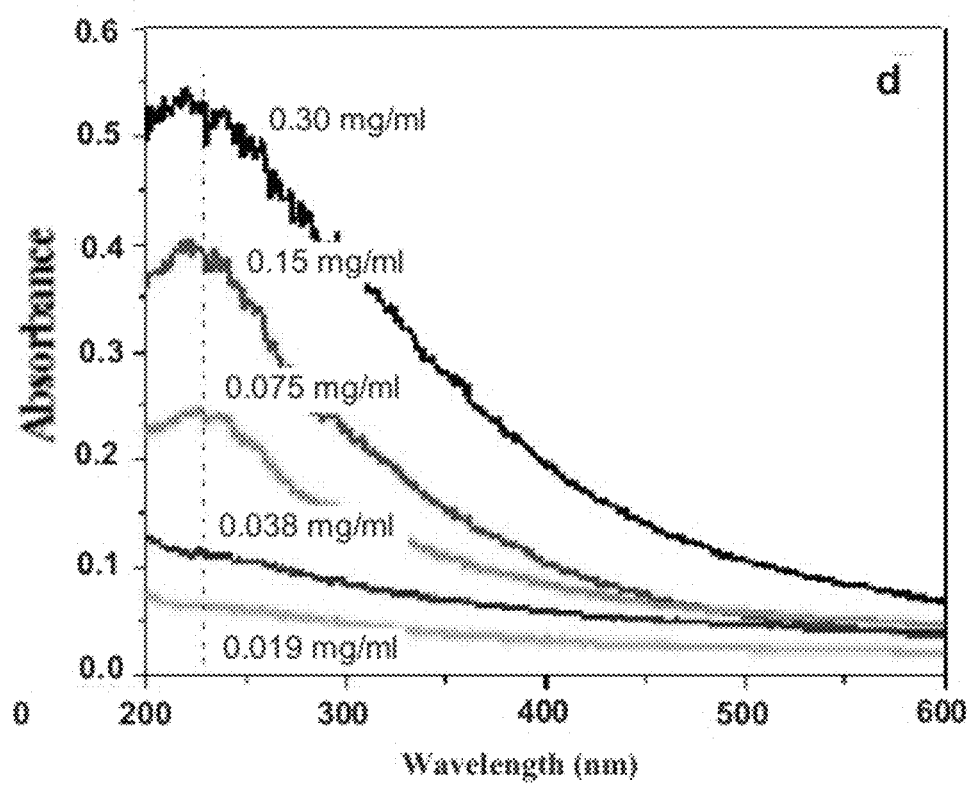

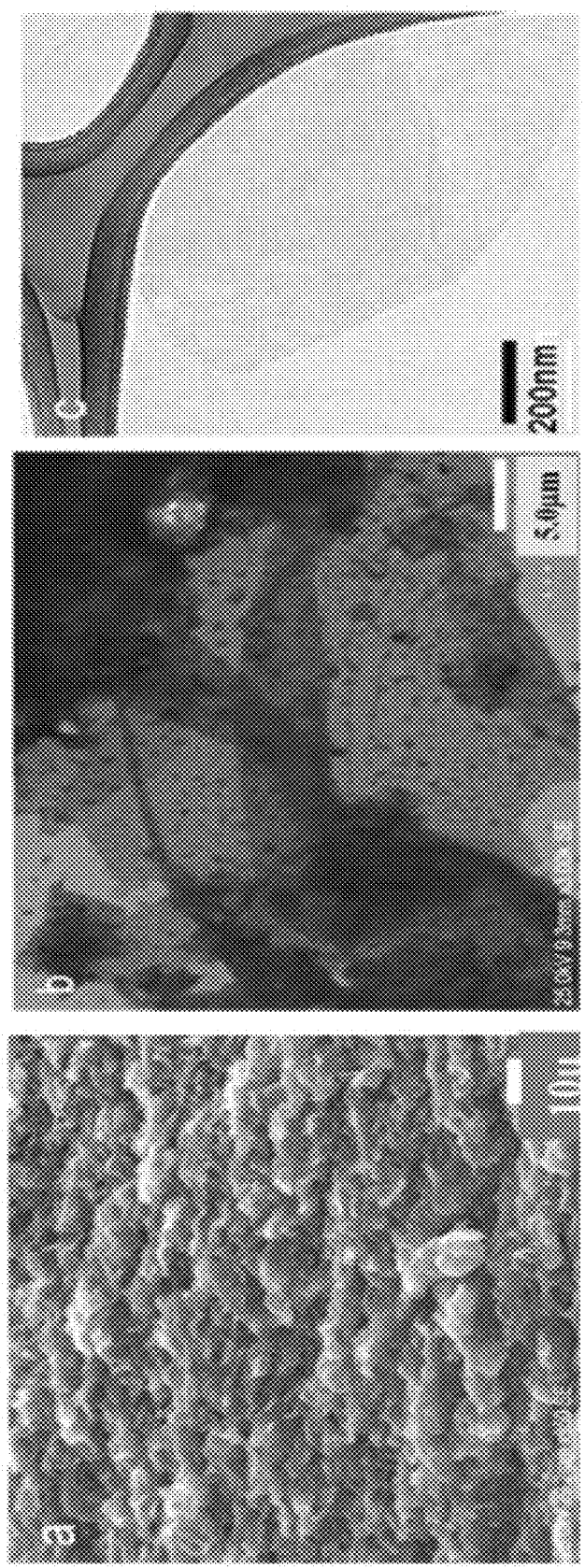
Figure 11. SEM of EDTA-RGO film (a), EDTA-RGO sheets (b) and TEM of EDTA-RGO (c).

CHELATING AGENT MODIFIED GRAPHENE OXIDES, METHODS OF PREPARATION AND USE

CROSS REFERENCE TO RELATED APPLICATION

This application is a continuation-in-part of International Application No. PCT/US2010/061796, filed Dec. 22, 2010, which claims benefit of U.S. Provisional Application No. 61/282,197 filed on Dec. 29, 2009. The entire contents and disclosures of the preceding applications are incorporated by reference into this application.

FIELD OF THE INVENTION

The invention is generally related to chemically modified graphene oxides with chelating agents and their applications in water purification, waste water treatment, battery research, fuel and solar cells, polymer composites, catalyst support and manufacturing, as well as the production of catalysts and water purification devices.

BACKGROUND OF THE INVENTION

Throughout this application, various references are referred to and disclosures of these publications in their entireties are hereby incorporated by reference into this application to more fully describe the state of the art to which this invention pertains.

It is to be noted that the transitional term "comprising", which is synonymous with "including", "containing" or "characterized by", is inclusive or open-ended and does not exclude additional, un-recited elements or method steps.

Graphene has various unique properties, including superior mechanical strength, low density and high heat conductivity. Many potential applications of graphene are based on its unique mechanical and electrical properties. For example, graphene oxide is water soluble with low electrical conductivity due to its large number of hydrophilic groups, such as hydroxyl, epoxide and carbonyl groups. Reduced graphene oxide, on the other hand, has good conductivity but poor solubility in water because most of the hydrophilic groups are removed during the reduction process and graphene oxide is converted to graphene with a rich π-conjugation system. Moreover, reduced graphene oxide is not compatible with other materials, such as polymers. This clearly limits its widespread use.

Several techniques have been developed to modify the surface properties of reduced graphene oxide in order to enhance its compatibility with other materials and to increase its solubility in aqueous and organic solvents. Potential techniques include (1) physically absorbing functional molecules onto the surface of graphene sheets, and (2) covalently linking functional groups onto the surface of graphene. These techniques have achieved little success in terms of broadening the use of reduced graphene oxides. For example, a dispersion of reduced graphene in aqueous solvents with other polymers has been obtained by physically absorbing aqueous soluble groups on the surface of reduced graphene oxide sheets. However, the presence of these physically absorbed compounds is not desirable for many of its potential uses. As a result, dispersions of reduced graphene oxide in aqueous solutions have remained largely unexplored. Also, due to the single layered structure with a π-conjugation system, it is difficult to disperse reduced graphene oxide in various organic solvents because the atoms in this π-conjugation system only have weak interactions with solvent molecules.

Scientists have been trying to modify graphene to influence these properties through chemical functionalization. For example, a number of methods have been developed for generating graphene and chemically modified graphene from graphite and graphene derivatives, each with its own disadvantages. (Park et al., 2009). There is a need to create new graphene derivatives having good solubility in aqueous solution and possessing other exceptional properties for various industrial applications.

BRIEF SUMMARY OF THE INVENTION

The invention relates to the design and method of synthesis of novel graphene derivatives with organic synthesis techniques through silane agents, carboxyl and amide groups, and their related applications. The molecules and materials contain a precursor material, named graphene, graphite oxide, graphene oxide (GO) or reduced graphene oxide (RGO) with any kind of single to multi-layer of carbon sheets from graphite with thickness ranging from 0.1 nm to 0.1 mm, size from 10 nm to 1 mm, and the functional groups with ethylene diamine tetra-acetate, ethylene diamine tri-acetate (EDTA) and other chelating groups.

One aspect of the invention is directed to chelating agent modified graphene oxides having the following formula: $G(A-B)_x$ wherein G is graphene oxide; wherein A is a linking moiety selected from the group consisting of $-(CH_2)_m-$, $-NH-$, $-S-$, $-O-Si(-OR^1)_2(-CH_2)_m-$, $-C(=O)-$, $-C(=O)-O-$, $-C(=O)-O(CH_2)_m-$, $-C(=O)-NH-$, $-C(=O)-NH-(CH_2)_n-$, $-P(=O)_2-O-$; wherein m is 1-12 and $R^1$ is H, or $C_1-C_{12}$ alkyl; wherein B is a chelating moiety; and wherein the ratio of basic graphene oxide units:x is from about 1:0.00001 to about 1:0.5.

Another aspect of the invention is directed to a process for modifying graphene oxide with chelating agents comprising the steps of: (a) preparing a silane solution of methanol, ethanol, water or another organic solvent; (b) dispersing graphene oxide in the organic solution, mixing it with the silane solution and letting silylation take place to yield a chelating agent modified graphene; and (c) reducing the silanized graphene oxide to yield the chelating agent modified graphene. In one embodiment, the chelating agent is ethylene diamine tri-acetate (also named ethylene diamine tri-acetic acid, or ethylene diamine tri-acetic acid tri-sodium salts) (EDTA). In another embodiment, the silane is $B-(CH_2)_m-Si-X_3$ or $B-(CH_2)_m-Si(OR^1)-X_2$ $B-(CH_2)_m-Si(OR^1)_2-X$, where X is Cl, Br or I and $R^1$ is H, $CH_3-$, or $CH_3CH_2-$.

Another aspect of the invention is directed to a process of synthesizing chelating agent modified graphene oxide, comprising the steps of (i) optionally treating graphene oxide with $SOCl_2$ or $SOBr_2$ to covert the carboxyl groups on the surface of said graphene oxide to corresponding $-C(=O)Cl$ groups or $-C(=O)Br$ groups and (ii) reacting said graphene oxide from step (i) with A-B to produce said chelating agent modified graphene oxide; wherein $-B$ is a chelating moiety and A- is selected from the group consisting of $HO-(CH_2)_m-$, $H-NH-$, $H-S-$, $R^1-O-Si(-OR^1)_2(-CH_2)_m-$, $HO-C(=O)-$, $HO-C(=O)-O-$, $HO-C(=O)-N-$, and $HO-P(=O)_2-O-$; wherein m is 1-12 and $R^1$ is H, $C_1-C_{12}$ alkyl.

Another aspect of the invention is directed to a method of using the chelating agent modified graphene oxide of claim 1 as support to anchor or in-situ synthesize metal nano- and and micro- particles catalysts, comprising the steps of (i) solubilizing or dispersing said chelating agent modified graphene oxide in aqueous or organic solvent; (ii) adding to the solution or suspension in step (i) a metal salt selected from the group of salts of Ni, Co, Fe, Pt, Ru, Au, Cr, Cu, Mg, Mn, Mo, Rh, Si, Ta, Ti, W, U, V, or Zr; and (iii) reducing or precipitating the metal complex of said chelating agent modified graphene oxide from step (ii) to produce micro- or nano- particles of said metal complex (or nanoparticles) for use as a catalyst.

Another aspect of the invention is directed to a method of using chelating agent modified graphene oxide to remove metal ions from water, comprising the steps of (i) placing said chelating agent modified graphene oxide into a filtration device; and (ii) passing metal-ion-containing-water through said filtration device to remove metal ions. Alternatively, step (ii) can be replaced with submerging said chelating agent modified graphene oxide into metal-ion-containing water to remove such metal ions. The metal ions to be removed from water include but not limited to: Ni, Hg, Cd, Co, Fe, Pt, Ru, Au, Cr, Cu, Mg, Mn, Mo, Rh, Si, Ta, Ti, W, U, V, Zr and Li. The removal of metal ions from water can produce drinking water, remove pollutants from the environment, or be used for metal extraction.

In another embodiment, the chelating agent modified graphene oxide is used to absorb quinone, anthquinone and any other quinone derivatives and for catalysis of the reduction of oxygen.

Another aspect of the invention is directed to a method of using chelating agent modified graphene oxide disclosed herein to produce lithium ion batteries, comprising the step of replacing the general carbon materials in the anodes and cathodes of lithium ion batteries with the lithium salt of said chelating agent modified graphene oxide.

Another aspect of the invention is directed to a process for modifying graphene with EDTA or other chelating groups, comprising the steps of: (a) preparing a silane solution of methanol or ethanol; (b) dispersing graphene in the organic solution, mixing it with the silane solution and letting silylation take place; and (c) reducing the silanized graphene oxide with $NH_2$—$NH_2$, $NaBH_3$ to yield a reduced chelating modified graphene oxide.

Another aspect of the invention is directed to the use of chelating agent modified graphene oxide as catalyst support for cathode or anode materials fabrication in the manufacturing of fuel cells, especially in direct methanol and ethanol fuel cells.

Another aspect of the invention is directed to the use of chelating agent modified graphene oxide to generate conducting polymers by forming composites with polymers such as polyaniline, polypyrrole and polythiophene, and any other polymer from monomers of aniline, pyrrole, thiophene and their derivatives.

Another aspect of the invention is directed to the use of chelating agent modified graphene oxide as drug delivery vehicles in medical devices.

Another aspect of the invention is directed to the use of chelating agent modified graphene oxide in solar cells.

Another aspect of the invention is directed to the use of composites between chelating agent modified graphene oxides and common and specific polymers as electron emission sources of field-emission displays, supercapacitor electrode materials, cathodes and anodes of lithium ion batteries, and in the enhancement of the performance of traditional Lead-acid battery systems.

Another aspect of the invention is directed to the use of composites of Nafion® and the chelating agent modified graphene oxide as general electrode materials.

A further aspect of the invention is directed to a method of functionalizing graphene with silane moieties. Such a method comprises contacting a graphene dispersion with a silane moiety to form a precursor mixture, and refluxing the precursor mixture to functionalize the graphene with silane moieties. One such example was depicted in FIG. 3.

The contents of the patents and publications cited herein and the contents of documents cited in these patents and publications are hereby incorporated herein by reference.

BRIEF DESCRIPTION OF THE DRAWINGS

FIG. 2 shows a general silane structure and a chelating silane structure.

FIG. 4 shows the four most common functional groups or chelating groups that can be linked to graphene oxide's surface.

FIG. 10 shows photographs of EDTA-RG (a) and EDTA-GO (b) at various concentrations and the UV-Spectra of EDTA-RG (c) and EDTA-GO (d). The concentration of EDTA-RGO and EDTA-GO shown in the respective vials are:

Vial 1: 0.019 mg/ml;

Vial 2: 0.038 mg/ml;

Vial 3: 0.075 mg/ml;

Vial 4: 0.15 mg/ml; and

Vial 5: 0.30 mg/ml.

FIG. 11 shows SEM of EDTA-RGO film (a), EDTA-RGO sheets (b) and TEM of EDTA-RGO (c).

Figure 12:
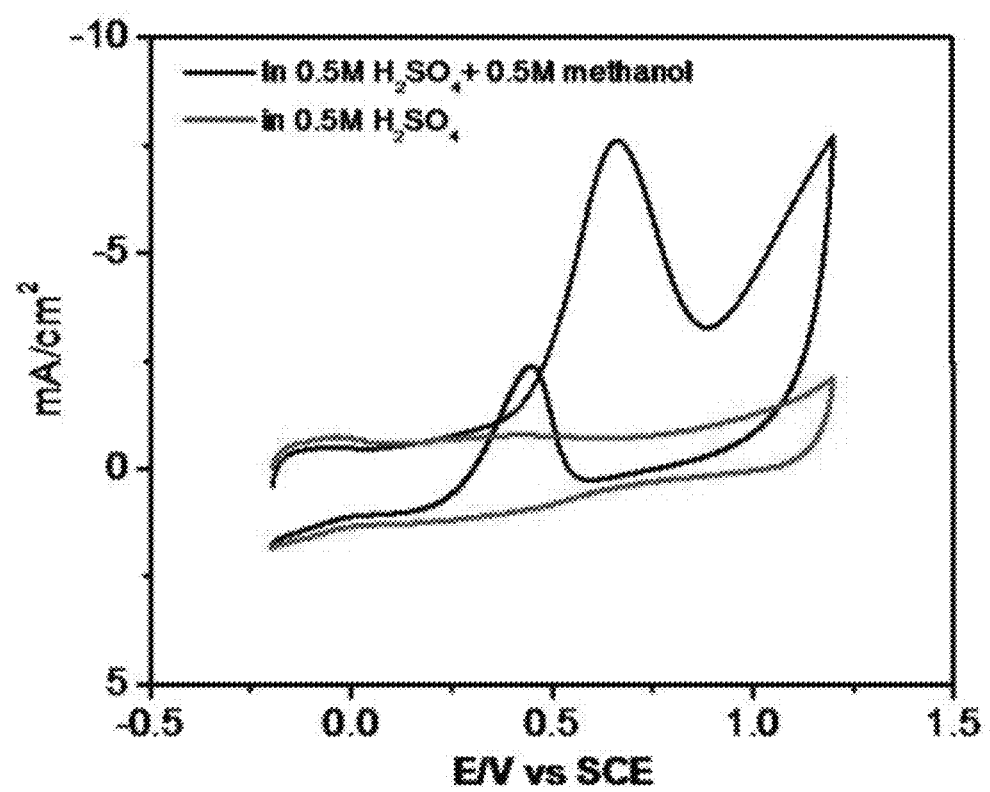

FIG. 12 shows the cyclic voltammograms of EDTA-RGO-supported Platinum Nanoparticles for the oxidation of methanol. Specifically, the figure shows cyclic voltammograms of EDTA-RGO/Pt-NPs in 0.5M $H_2SO_4$ and in 0.5M $H_2SO_4$ with 0.5M methanol scan rate: 60 mV/S.

Figure 13:
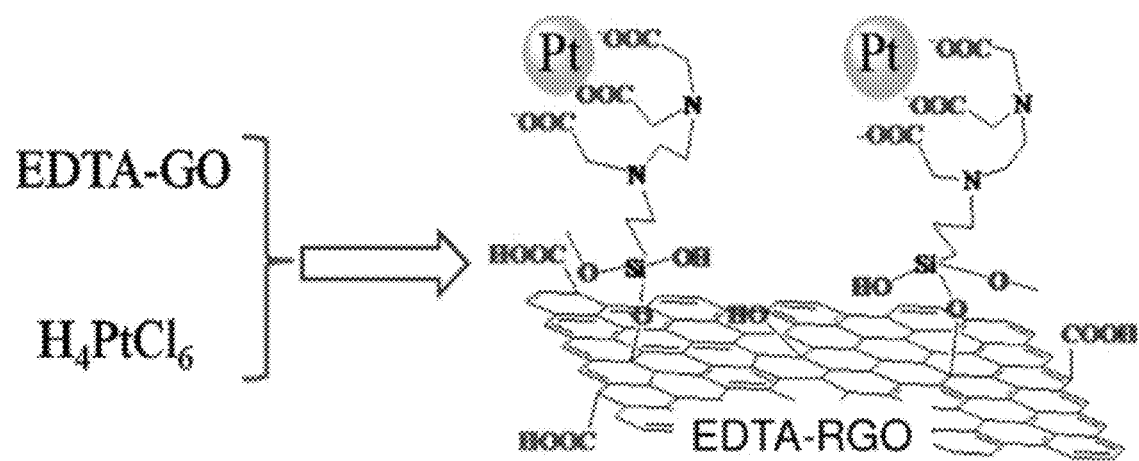

FIG. 13 shows a scheme to load Pt Nanoparticles onto the EDTA-RGO surface.

Figure 14:
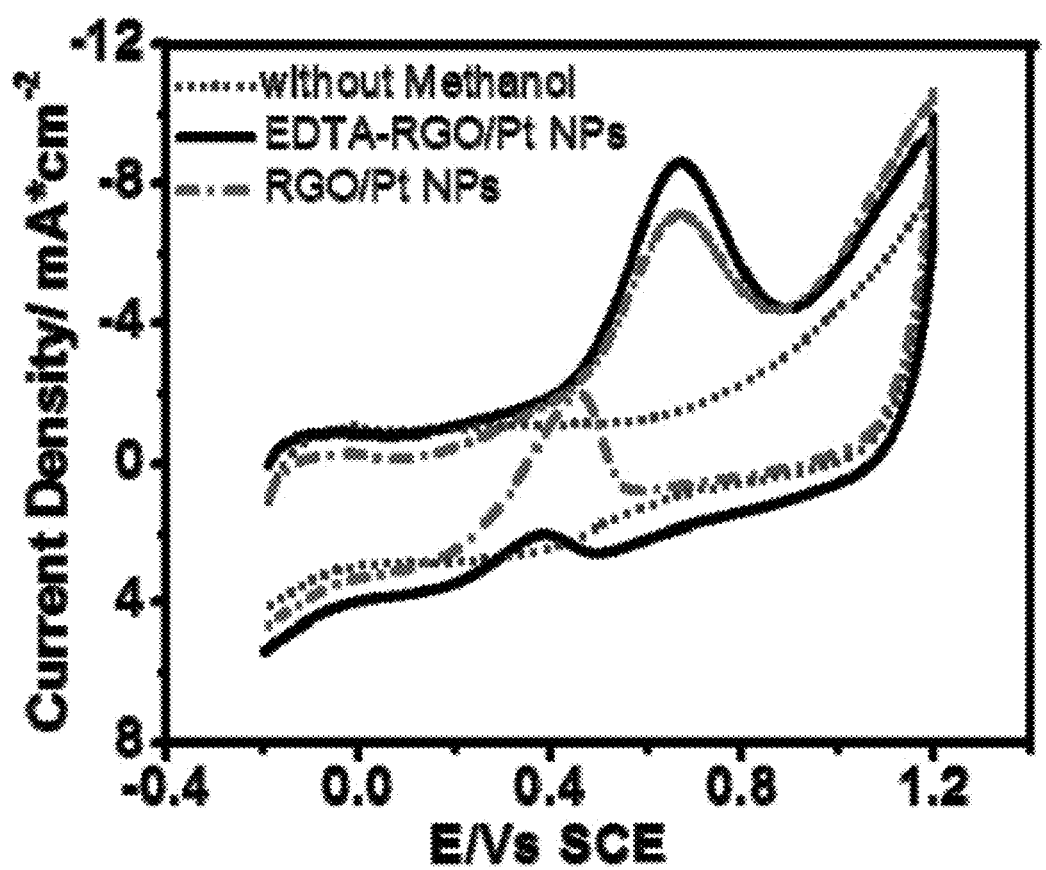

FIG. 14 shows the cyclic voltammograms of EDTA-RGO/Pt-NPs/GC electrode in 0.5 M bulk $H_2SO_4$ and in methanol solution (0.5 M methanol+0.5 M $H_2SO_4$) and GO/Pt-NPs/GC in the same methanol solution. The Scan rate is 60 mV·$S^{-1}$.

DETAILED DESCRIPTION OF THE INVENTION

As used herein, "graphene oxide" or "GO" means graphene oxide and reduced graphene oxide or "RGO" represented by the formulas I and II respectively:

Formula I

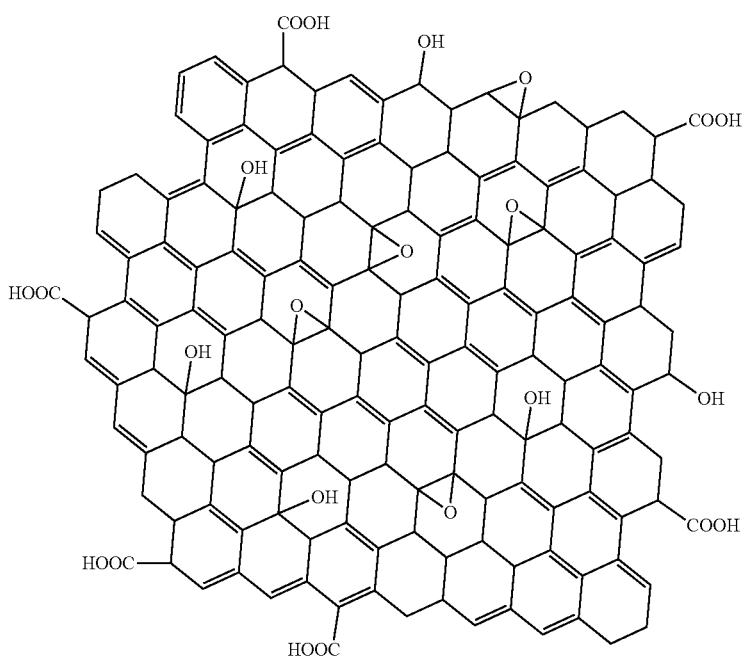

Formula II

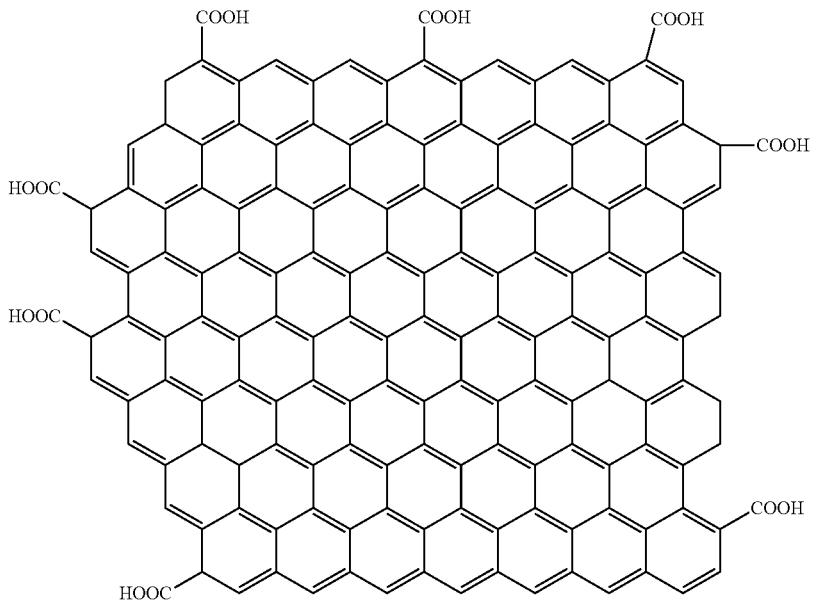

Each "basic graphene oxide unit" includes a single carbon atom within the graphene oxide layer and any functional group attached to such a carbon atom. Graphene oxide includes single layer graphenes, multiple layer graphene oxides, graphite oxide surfaces, and graphene oxide nano ribbons. It can also include graphene oxide materials obtained from sources such as oxidized graphite with a strong oxidizing regent such as $H_2SO_4$, $HNO_3$, $KMnO_4$, $KClO_3$; chemical vapor deposition of graphene, graphite oxide, or graphene oxide, either in a single layer or in multiple layers. Graphene oxide also includes graphite oxide surfaces, and graphene oxide nano ribbons. In one embodiment, the length and width of a single layer graphene oxide ranges from about 10 nm to 1 mm.

The thickness of a single layer graphene oxide ranges from about 0.385 nm to 5 nm with size from 10 nm to 1 mm. The length and width of multilayer graphene oxide ranges from 0.1 nm to 1 mm, thickness from 0.1 nm to 100 microns. Graphene oxide sheets such as single graphene oxide sheets, and arrays of these materials (hereafter referred to collectively as graphene-like graphene oxide and reduced graphene oxide) have enormous opportunities for novel electric, mechanical and chemical properties. The reduction states are obtained by reduction by $NH_2$—$NH_2$, $LiAlH_4$ or $NaBH_4$, other reductants and thermal exfoliation techniques.

The term "chelating agent" means any organic compound which can form coordinated bonds with metal ions through two or more of its atoms (mainly O, N, P and S). A chelating agent that has two coordinating atoms is called bidentate; one that has three coordinating atoms is called tridentate and so on. For example, EDTA is a common hexadentate chelating agent and its chemical name is ethylenediaminetetraacetate.

The term "A" or "linking moiety" means any group that facilitates the chemical attachment of chelating moieties to graphene oxide. Examples of linking moieties include —$(CH_2)_m$—, —NH—, —S—, —O—$S_i$(—$OR^1$)$_2$($CH_2$)$_m$—, —C(=O)—O($CH_2$)$_m$—, —C(=O)—NH—, —C(=O)—NH—($CH_2$)$_m$—, —C(=O)—, —C(=O)—O—, —C(=O)—N—, —P(=O)$_2$—O—; wherein m is 1-12 and $R^1$ is H, $C_1$-$C_{12}$ alkyl. Examples of "A" also include HO—($CH_2$)$_m$—, H—NH—, H—S—, H—O—$S_i$(—$OR^1$)$_2$($CH_2$)$_m$—, —C(=O)—O($CH_2$)$_m$—, —C(=O)—NH—, —C(=O)—NH—($CH_2$)$_m$—HO—C(=O)—, HO—C(=O)—O—, HO—C(=O)—N—, HO—P(=O)$_2$—O—; wherein m is 1-12 and wherein $R^1$ is H, alkyl, aryl, alkenyl, alkynyl, amino or hydroxyl, wherein the amino and hydroxyl are optionally substituted with alkyl or aryl. Preferably $R^1$ is H, or $C_1$-$C_{12}$ alkyl and more preferably, $R^1$ is H, or $C_1$-$C_4$ alkyl.

The term "chelating moiety" or "B" means any chelating agent or groups with chelating functions chemically attached to graphene either directly or through a linking moiety or "A". Such chelating moieties can form covalent bonds with A to form an intermediate which can be used as starting material for the synthesis of chelating agent modified graphene oxide.

The term "silane" means silicon-containing chemicals that possess a hydrolytically sensitive center that can react with graphene oxide or reduce graphene oxide to form stable covalent bond(s) and also alter the physical and chemical properties of graphene oxide. "Silane coupling agent" means chemical compounds such as B—($CH_2$)$_m$—Si—$X_3$; wherein B is a chlelating moiety; wherein m is 1-12, and X is hydrolysable groups, typically alkoxy, acyloxy, halogen or amine.

In one embodiment, the chelating agent modified graphene oxide contains functional groups —COOH, —OH and —O—, preferably —COOH, or —OH. The ratio of basic graphene units:linking moieties:chelating moieties in the chelating agent modified graphene oxide is from about 1:0.00001 to about 1:0.5, preferably from 1:0.0001 to about 1:0.35, more preferably from about 1:0.0003 to about 1:0.32, more preferably from about 1:0.001 to about 1:0.3, more preferably from about 1:0.005 to about 1:0.25, more preferably from about 1:0.01 to about 1:0.2 and the most preferably from about 1:0.02 to about 1:0.15.

A preferred linking moiety is —O—$S_i$(—$OR^1$)$_2$($CH_2$)$_m$—; wherein $R^1$ is H, alkyl, aryl, alkenyl, alkynyl, amino or hydroxyl, wherein the amino and hydroxyl are optionally substituted with alkyl or aryl; wherein m is 1-12. A preferred alkyl group includes straight-chain or branched $C_1$-$C_{18}$ alkyl or ($C_4$-$C_8$)-cycloalkyl. A preferred aryl group includes phenyl, benzyl, naphthyl, phenanthryl or pyridyl which may each be substituted by 1-3 substituents selected independently from the group consisting of a straight-chain or branched ($C_1$-$C_6$)-alkyl radical, a ($C_3$-$C_7$)-cycloalkyl radical, a straight-chain or branched ($C_1$-$C_6$)-alkoxy, hydroxy, amino, di($C_1$-$C_6$)alkylamino, nitro and cyano. As to the alkenyl group, it is possible to use, for example, vinyl or propenyl. As to the alkynyl group, it is possible to use, for example, ethynyl. A more preferred $R^1$ is selected from the group consisting of H or $C_1$-$C_{12}$ alkyl and the most preferred $R^1$ is H or $C_1$-$C_4$ alkyl. It is also understood that —OR can optionally be a chelating moiety.

In one embodiment, —($CH_2$)$_{mm}$—B is selected from the group consisting of:

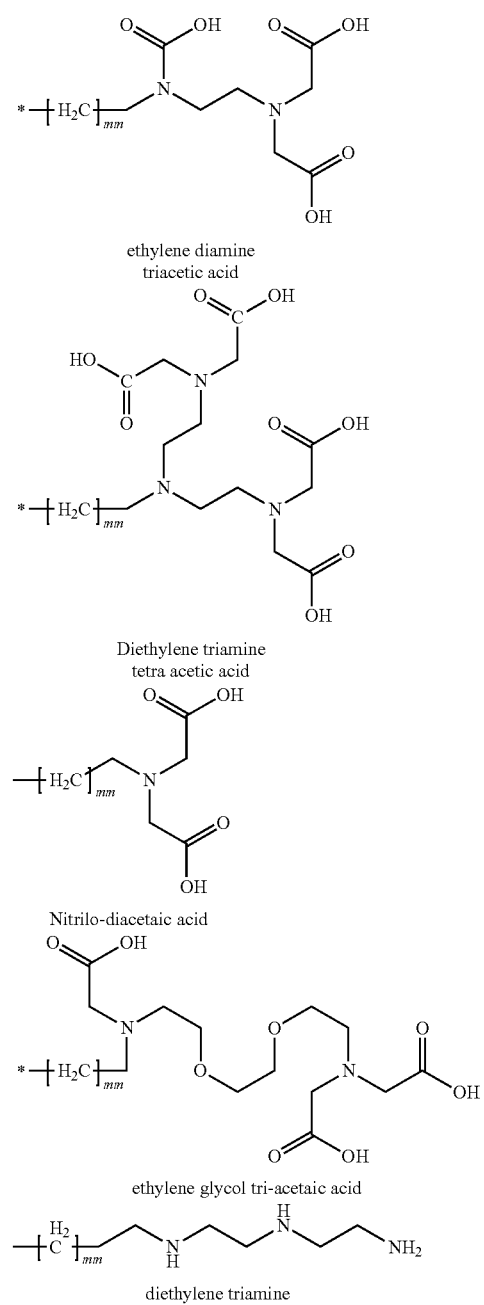

ethylene diamine triacetic acid

Diethylene triamine tetra acetic acid

Nitrilo-diacetaic acid ethylene glycol tri-acetaic acid diethylene triamine or their salts; wherein "mm" is 1-12, preferably, mm is 1-4. Another preferred chelating moiety is $C_1$-$C_{12}$ alkyl ethylene diamine triacetic acid or its salts, including ethelene dimaine tri-actic acid (EDTA), diethylene tri-amine tetra-acetic acid, anitrole-diacetic acid and their salts, The following examples are given as specific illustrations of the invention. It should be understood, however, that the invention is not limited to the specific details set forth in the examples. All parts and percentages in the examples, as well as in the remainder of the specification, are by weight unless otherwise specified.

Further, any range of numbers recited in the specification or paragraphs hereinafter describing or claiming various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. The term "about" when used as a modifier for, or in conjunction with, a variable, is intended to convey that the numbers and ranges disclosed herein are flexible and that practice of the present invention by those skilled in the art using temperatures, concentrations, amounts, contents, carbon numbers, and properties that are outside of the range or different from a single value, will achieve the desired result, such as good solubility, high metal ion absorption capability, etc.

EXAMPLE 1

Preparation of Pre-Treated Graphite

Graphite (from Aldrich) was used for the preparation of graphene oxide by a modified Hummers' method. Graphite powder was first oxidized by sulfuric acid. 0.1 g, 0.5 g, 1 g, 5 g and 10 g of the graphite powder was first treated with a solution by mixing 1, 5, 10, 50 and 100 ml of concentrated $H_2SO_4$ with 0.1, 0.5, 1, 5 and 20 gg $K_2S_2O_8$ and 2, 5, 10, 15 g and 20 g $P_2O_5$ respectively. The mixture was kept at 20~90° C. for 1~24 hours using a hotplate. Then, the mixture was cooled to room temperature and diluted with 100 ml, 250 ml, 500 ml, 1.0 L and 2.0 L de-ionized (DI) water respectively and left overnight at room temperature. The mixture was filtered and the solid product was washed with deionized water to remove any residual acid and dried under ambient conditions overnight to obtain pre-treated or pre-oxidized graphite.

EXAMPLE 2

Synthesis of GO Powder

The pre-oxidized graphite from example 1 was subjected to oxidation by Hummers' method. 0.1 g, 0.5 g, 1 g, 5 g and 50 g pretreated graphite powder was put into 1 ml, 5 ml, 10 ml, 20 ml and 50 ml cold (0° C.) concentrated $H_2SO_4$. Then 0.1 g, 0.5 g, 1 g, 5 g and 50 g $KMnO_4$ were added gradually under stirring, and the temperature of the mixture was kept below 20° C. by cooling. The mixture was then stirred at 35° C. for 4 hours and then diluted with 10, 50, 100, 200 and 500 ml DI water. The dilution was carried out in an ice bath to keep the temperature below 40~50° C. After adding DI water, the mixture was stirred for 30 mins to 24 hours, and then an additional 50, 250, 500, 1000 and 2500 ml DI water was added. Shortly thereafter, 1, 5, 10, 20, and 50 ml 30% $H_2O_2$ was added to the mixture, and the color of the mixture changed into brilliant yellow and began bubbling. The mixture was filtered and the solid product was washed with 0.1 M HCl to remove metal ions, followed by DI water to remove any acid residual and by drying in the air to obtain graphene oxide (GO) powder.

EXAMPLE 3

Preparation of EDTA-GO 1, 2, 5, 10 and 100 mg GO was added to a three-neck flask with 10, 20, 50, 100 and 500 ml ethanol respectively and dispersed into ethanol using ultrasonication for 1~60 min. Then 1~50 ml 0.1~15% hexane, acetonitrile and ethanol solution of N-(trimethoxysilylpropyl) ethylenediamine triacetic acid or N-(trimethoxysilylpropyl) ethylenediamine triacetic acid tri sodium salt (EDTA-silane) was added and stirred for 1~48 hours at 30-85° C. to complete GO silylation. After the reaction was finished, 100 ml of water, ethanol and methanol was added to dilute the unreacted silane molecules. The product (EDTA-GO) was obtained by filtration and washed with methanol and water sequentially and then dried.

EXAMPLE 4

Preparation of EDTA-RGO

To reduce EDTA-GO to reduced EDTA-graphene (named as EDTA-RGO), 100 mg EDTA-GO was dried in a vacuum oven at 40~160° C. for 1~36 hours and then dispersed into 10~500.0 ml DI water. Hydrazine was added to the solution to reduce EDTA-GO to EDTA-RGO. Upon reduction, the solution changed from brown to black in color and the product, EDTA-RGO, was obtained by filtration, washing with methanol, water and HCl sequentially, and drying in an oven.

EXAMPLE 5

FTIR Characterization of Graphene Materials

Figure 8:
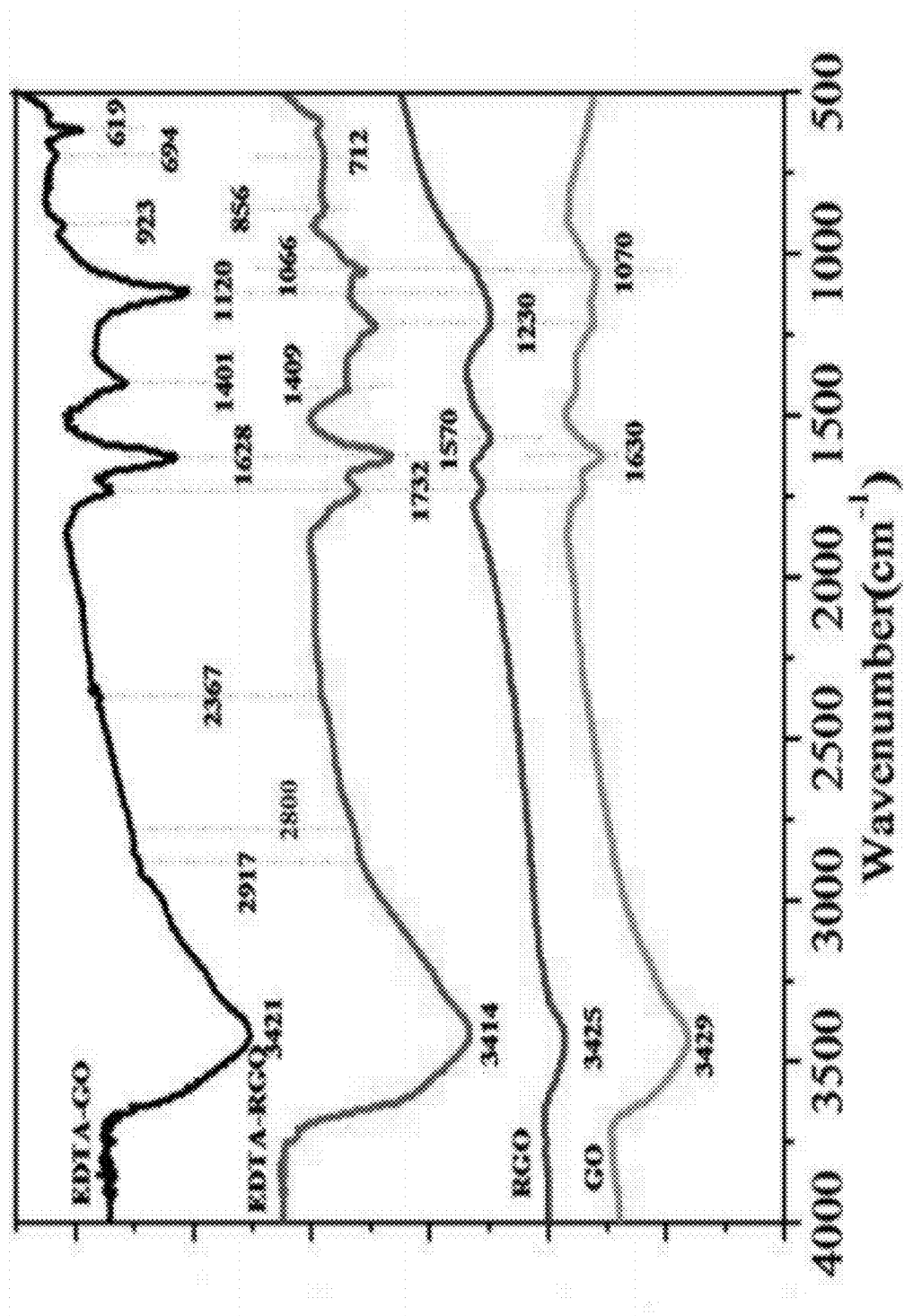
FIG. 8 shows FT-IR spectra of RG, EDTA-RG and EDTA-GO.

GO, RGO, EDTA-GO and EDTA-RGO were separately pressed into pellets with potassium bromide and then scanned from 500 $cm^{-1}$ to 4000 $cm^{-1}$ at a resolution of 4 $cm^{-1}$ on a Fourier transform infrared (FTIR) spectrometry from Perkin Elmer Spectrum One, USA. The Spectrum is shown in FIG. 8.

EXAMPLE 6

The SEM images of these materials were taken on a JEOL 2010F microscope (JEOL Ltd., Japan) with an energy dispersion X-ray (EDX) analyzer. FIG. 10 show a typical SEM image of single layer EDTA-GO sheet on an ultra-smooth gold surface, this sample was prepared by drop-casting of diluted EDTA-GO and EDTA-RGO $H_2O$ suspension (with 1 hour sonication treatment). The dimensions of EDTA-RG range from several hundred nanometers to several micrometers and graphene oxide sheets with lateral size up to 40 μm were observed. EDTA-RGO appears transparent and is folded over on one edge, with isolated small fragments of graphene on its surface, and proves that water-soluble EDTA-RGO is similar to single graphene sheets peeled from pyrolytic graphite. The transmission electron microscopy (TEM) characterization of these materials were used to characterize the changes in structure and surface morphology of the graphene after each treatment step.

EXAMPLE 7

Characterization of EDTA-RGO and EDTA-GO was performed by utilizing the FTIR spectra of the EDTA-RGO, EDTA-GO, GO and RGO as shown in FIG. 8. Comparing the spectra of EDTA-GO and EDTA-RGO with GO and RGO, several new peaks are observed which indentify the presence of silane on the graphene surface. The presence of two new bands at 2917 and 2800 $cm^{-1}$ in the spectra of EDTA-GO and EDTA-RGO is associated with the stretching of the methylene groups from the EDTA-silane molecules, and the new bands that appeared at 1401 $cm^{-1}$ (EDTA-GO) and 1409 $cm^{-1}$ (EDTA-RGO) are attributed to the γCH2 group of EDTA. Upon modification with EDTA-silane, the presence of ionized carboxyl groups from the EDTA chain was observed by the appearance of a new band at 1628 $cm^{-1}$. This band was observed for the EDTA-GO and EDTA-RGO samples only and with the same strength. In addition, the band at 694 $cm^{-1}$ from EDTA-GO corresponds to the stretching vibration of Si—O—C. After reduction with hydrazine, the 694 cm$^{-1}$ band shifted to 712 cm$^{-1}$ in EDTA-RGO. The new bands at 923 cm$^{-1}$ from EDTA-GO and 856 cm$^{-1}$ from EDTA-RGO correspond to the Si—OH vibration, and the band ff EDTA-RGO at 1066 cm$^{-1}$ was assigned to the formation of Si—O—C. The presence of carboxyl groups of four graphene materials was confirmed by the band at about 3421 cm$^{-1}$, and the presence of a band at 1732 cm$^{-1}$ is characteristic of the C=O stretching mode of both the carboxylic and carbonyl groups of graphene. The 1732 cm$^{-1}$ band was observed for all of the four graphene samples with almost the same strength and little frequency shift. The presence of bands at 1630 cm$^{-1}$ (GO) and 1570 cm$^{-1}$ (RGO) are attributed to asymmetric vibrations of the carboxylate groups. This stable band suggests that the carboxylic or carbonyl groups of graphene were not reduced to C—OH. The band at 1120 cm$^{-1}$ for EDTA-GO and the band at 1070 cm$^{-1}$ for GO suggests the presence of an epoxy group on the graphene surface. Upon reduction with hydrazine, the 1120 cm$^{-1}$ band disappeared for EDTA-RGO samples and the 1070 cm$^{-1}$ band disappeared for RGO samples, indicating that the reduction process converts C—O—C on the graphene oxide surface to π-conjugation. This conclusion was also verified by energy dispersive X-ray data, which will be discussed later.

EXAMPLE 8

Figure 6:
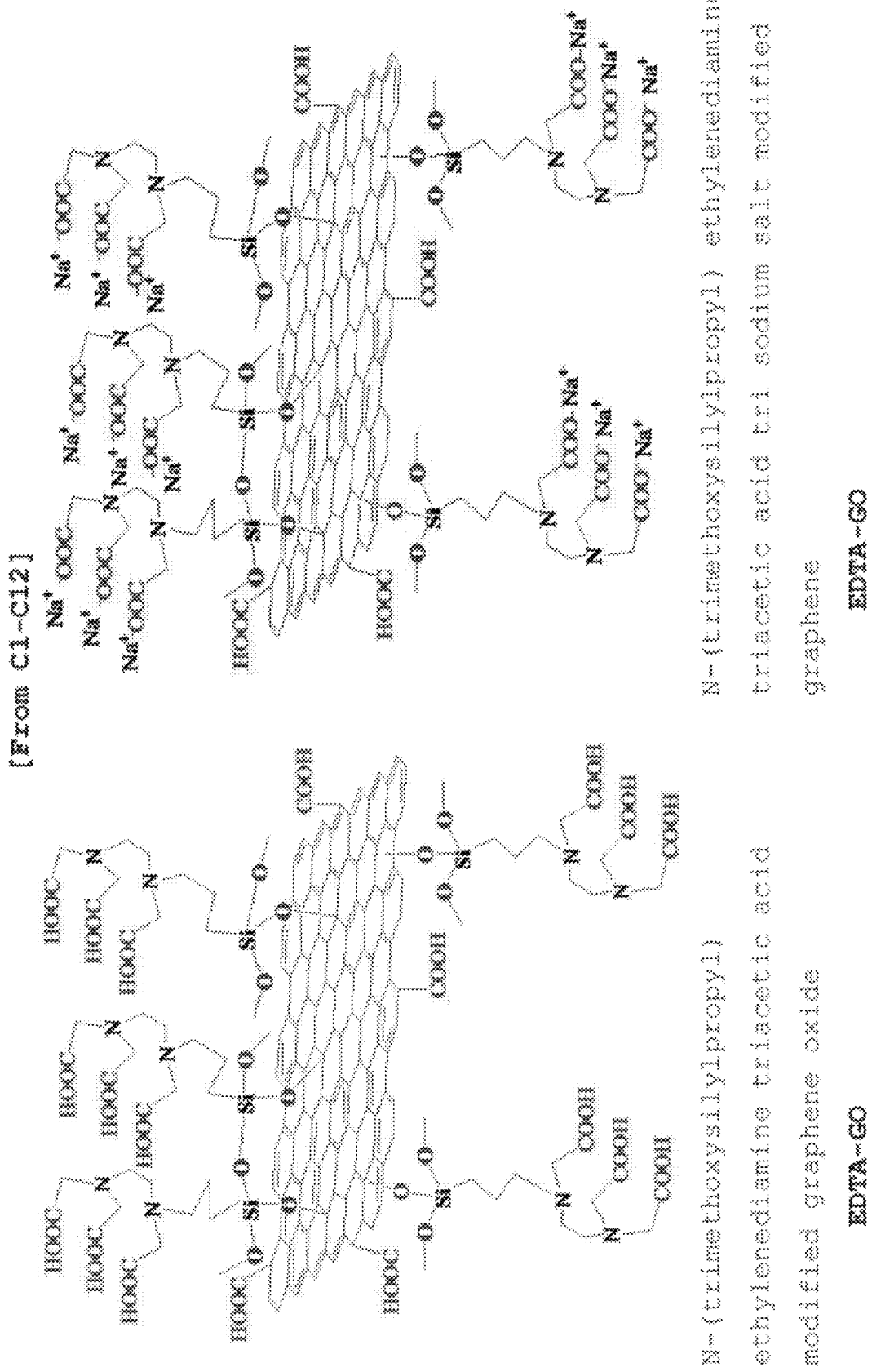
FIG. 6 shows examples of structures for EDTA modified graphene oxide.
Figure 7:
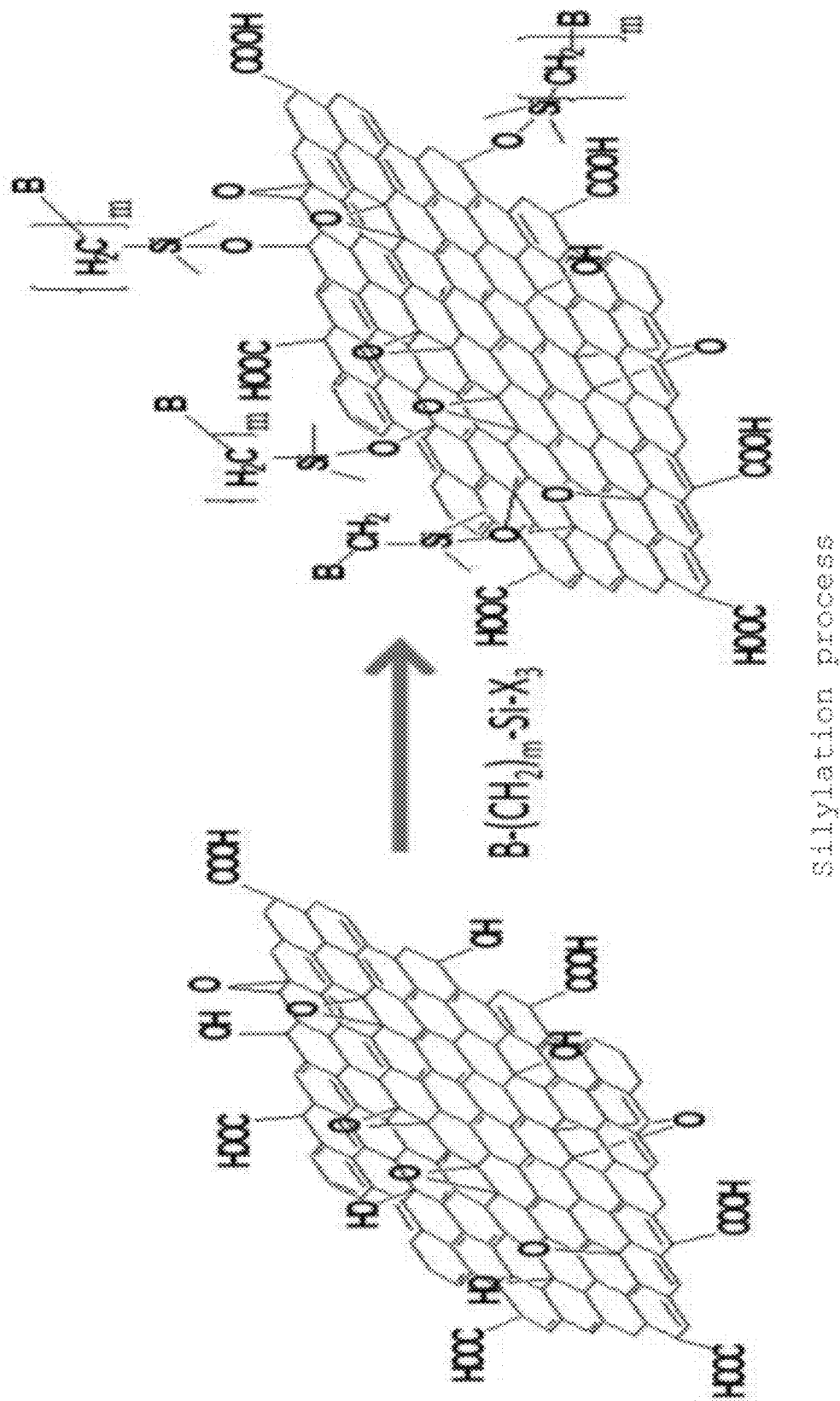
FIG. 7 shows a chemical modification process to convert graphene oxide to chelating agent modified graphene oxide.
Figure 9:
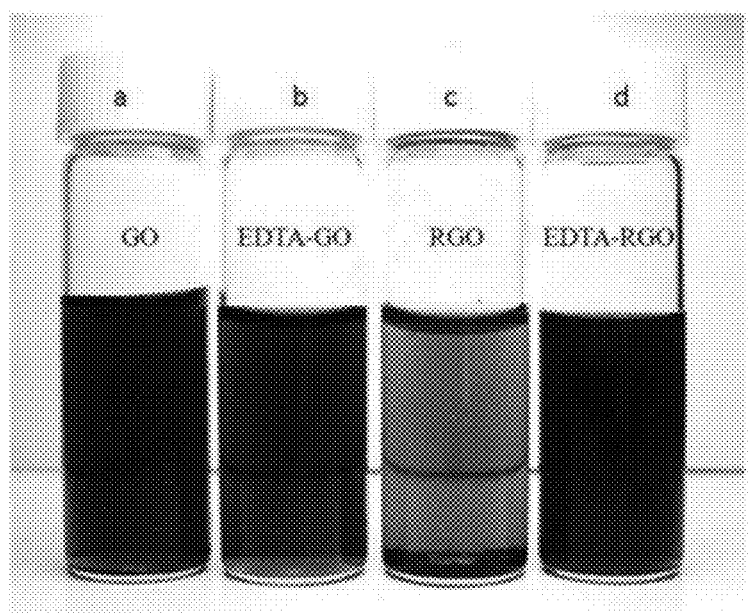
FIG. 9 shows photographs of GO (a), EDTA-GO (b), RGO (c) and EDTA-RGO (d) solutions in water.

To compare the stability of the graphene water suspensions obtained at different processing steps, 1 mg/ml water suspensions of GO, RGO, EDTA-GO and EDTA-RGO were prepared. FIG. 9 illustrates the suspension states of 1.0 mg/ml GO and RGO in water after 1.5 hours of dispersion via sonication. The GO suspension was stable as indicated in other reports. The solubility of RGO in water was rather poor, and sedimentation occurred within 12 hours. This sedimentation of RGO resulted from agglomeration and poor hydrogen-bonding capability. FIGS. 6b and d illustrate 1.0 mg/ml water suspensions of EDTA-GO and EDTA-RGO after 1.5 hours of dispersion via sonication. Both EDTA-GO and EDTA-RGO exhibited good solubility in aqueous solution, especially EDTA-RGO, which showed no phase separation, and sedimentation did not occur until after three months.

EXAMPLE 9

FIGS. 10 a and b show EDTA-RGO and EDTA-GO suspensions of various concentrations, respectively, which were stored up to 3 weeks. The concentrations varied from 0.019 to 0.3 mg/ml, and the colors of the EDTA-RGO solutions became dark with an increase of the concentrations of EDTA-RGO. A light brown color was observed in the EDTA-GO suspensions, whereas the black color of the EDTA-RGO suspensions confirmed the restoration of the conjugate network within the graphene sheet structure. The presence of EDTA generated a stable dispersion in water, enabling us to investigate the UV-vis absorption properties of the EDTA-RGO solutions. The absorption spectra recorded at different EDTA-RGO and EDTA-GO concentrations (from 0.019 mg/ml to 0.30 mg/ml). The spectra were plotted in the wavelength range from 200 to 600 nm. In contrast, the solution of EDTA-RGO displayed a well-featured curve with an absorption maximum at 280 nm, which tailed to 800 nm. Compared with EDTA-RGO, the absorption peak of the EDTA-GO solution at about 230 nm was gradually shifted to 280 nm for EDTA-RGO. The absorption in the whole spectral region increased with increasing concentrations. As a control, the solution of EDTA-GO displayed a featureless absorbed curve, which increased steeply in the UV region, with an absorption maximum at 230 nm, tailing to 800 nm. The absorptions of EDTA-GO were proportional to the concentrations of EDTA-GO.

EXAMPLE 10

In this example, EDTA-RGO is used as a support material for in-situ synthesis of Pt nanoparticles. It is demonstrated that EDTA groups can anchor Pt-NPs on the graphene surface (referred to hereinafter as "EDTA-RGO/Pt-NPs"). The EDTA-RGO/Pt-NPs exhibit higher catalytic activity, longer stability, and excellent tolerance capability to CO poisoning. The results strongly indicate that graphene surfaces modified with the desired groups can dramatically enhance the surface properties of graphene which play a vital role in the antipoisoning activity of Pt-NPs electrocatalysts.

Procedure to obtain the EDTA-RGO supported Pt-NPs (EDTA-RGO/Pt-NPs):

The procedure to obtain the EDTA-RGO supported Pt-NPs (EDTA-RGO/Pt-NPs) is illustrated in FIG. 13. The synthesis of Pt-NPs was completed by mixing EDTA-GO powder with hexachloroplatinic acid ($H_2PtC1_6$*x$H_2O$) in an ethylene glycol (EG) solution and then the solution was refluxed under argon protection at 40~140° C. for 1-18 h. The mass ratio of EDTA-GO to $H_2PtCl_6$ varied from 1:0.001 to 1:1. The reduction of $H_2PtCl_6$ to Pt-NPs and reduction of the graphene oxide to reduced graphene oxide were completed during the one reflux process. Then EDTA-RGO/Pt-NPs were isolated by filtration and washed with methanol and water sequentially. Finally, the product was dried in a vacuum oven at 60~120° C. for 1~12 h; this treatment procedure can enhance the catalytic activity and stability of EDTA-RGO/Pt-NPs for methanol oxidation.

To fabricate a working electrode, 10 mg of EDTA-RGO/Pt-NPs were initially dispersed in 5.0 ml 0.5% Nafion ethanol solution and then stirred for 24 h to entirely disperse EDTA-RGO/Pt-NPs into Nafion ethanol solution. Nafion is used as an adhesive to affix the catalysts to the electrode surface. Then, 1~1000 μl of this suspension was placed onto the surface of a glassy carbon (GC) electrode and dried. Finally, another 1~1000 μl 0.2% Nafion ethanol solution was applied and dried. This as-prepared electrode is referred to hereinafter as "EDTA-RGO/Pt-NPs/GC electrode".

Cyclic voltammetry: Electrochemical catalytic behavior of the EDTA-RGO/Pt-NPs/GC electrode towards the oxidation of methanol was examined by cyclic voltammetry (CV) and the results are shown in FIG. 14. To compare the catalytic activities of Pt-NPs on RGO and EDTA-RGO surfaces, the CV process was performed at room temperature (25±1)° C., the scan rate of two electrodes was fixed at 60 mV·S$^{-1}$, and the solution was a 0.5 M methanol+0.5 M $H_2SO_4$ solution. The potential scan started at −0.2 V and ended at 1.2 V (forward potential scan) and then back from 1.2 V to −0.2 V (reverse potential scan). When the scan is from −0.2 V to 1.2 V, the oxidation peak of methanol appears at 0.67 V and the peak current density is defined as the forward anodic peak current density ($I_f$). In the reverse potential scan, the scan is back from 1.2 V to −0.2 V, a peak appears at ~0.5 V, the peak current density is designated as the reverse (or backward) anodic peak current density ($I_b$). The reverse anodic peak is attributed to the oxidation of $CO_{ads}$-like species, and it is believed that these species are generated from the incomplete oxidation of methanol during the forward potential scan.

Stabilities of EDTA-RGO/Pt-NPs: A major concern in current fuel-cell technology stems from the stability of catalysts;

stability is a critical parameter for evaluation of anode materials. To investigate the stability of the EDTA-RGO/Pt-NPs/GC electrode toward the oxidation of methanol, cyclic voltammetry was used to test the stability of Pt-NPs catalysis behavior towards the oxidation of methanol. $I_f$ after 400 CV cycles is ~80% of the initial $I_f$ values, demonstrating that the EDTA-RGO/Pt-NPs/GC electrode exhibits a stable forward current. Although the initial decay occurs because of the formation of intermediate species such as $CO_{ads}$, $CH_3OH_{ads}$, and $CHO_{ads}$ during the oxidation, the decay rate is much slower than most graphite supported Pt-NPs.

Our experiment has demonstrated that the presence of EDTA groups on RGO surfaces plays a critical role in the catalytic activities of Pt-NPs. The presence of EDTA groups can significantly enhance the electrocatalytic activity of Pt-NPs for methanol oxidation to $CO_2$, and the EDTA groups can more effectively enhance CO-poisoning tolerance.

The effect of the substrate surface groups on the catalytic properties of the Pt-NPs are a topic for further investigation, so that potential mechanisms of action can be elucidated. It has been demonstrated that the oxygen groups on the graphene substrate surface can promote the oxidation of adsorbed CO. In addition, thermodynamic analysis has proven that nitrogen (or boron) doped graphene improves CO tolerance of Pt nanoparticles and the strong binding of Pt nanoparticles on defective graphene leads to enhancing stability. Thus, the anti-poisoning capability of Pt-based nanoparticles toward $CO_{ads}$ depends on the surface groups, the group types and the group surface densities of substrates. On EDTA-RGO surfaces, the EDTA group on the graphene surface contributes not only nitrogen atoms, but also —OH and —COOH groups. These groups provide a strong binding to anchor Pt-NPs, and create a hydrophilic microenvironment, which may also enhance the anti-poisoning properties of EDTA-RGO/Pt-NPs. The possible mechanisms of the effects of the EDTA groups on the activity of Pt-NPs are as follows: firstly, Pt metal ions can form a complex with the carboxyl anions and amine groups. In the fabrication process, the presence of EDTA on the GO surface can control the nanoparticle size, narrow the particle size distribution and prevent the Pt-NPs from aggregation. Secondly, after the fabrication of Pt-NPs on the EDTA-RGO surface, EDTA plays several roles in enhancing Pt-NPs catalysis properties as set forth below.

Role 1: EDTA has three carboxyl anions and two nitrogen-containing groups. Hence, there is a complex interaction between the EDTA groups and Pt-NPs. This complex interaction can exert steric hindrance and coulombic effects on the metal particles, thereby stabilizing Pt-NPs. The strong interaction between Pt-NPs and EDTA can induce modulation in the electronic structure of Pt-NPs, control the structure and shape of the NPs, lower the Pt-CO binding energy and thus reduce the CO adsorption on Pt. Role 2: the presence of EDTA groups enhance the hydrophilic properties of RGO and thus promote water activation. As a result, the adsorbed OH species at the Pt-NPs promote the oxidation of CO (Sharma et al. (2010), and Liu, et al. (2007)). Role 3: the EDTA groups can provide additional reaction sites, like most nitrogen substituted graphenes, to bind Pt-NPs, to stabilize the Pt-NPs against. coarsening, and then to enhance the stability and efficiency of Pt-NPs. Role 4: the EDTA groups can enhance charge transfer between reactants and electrodes.

In addition, data generated in the series of experiments presented also indicates that if current decay rates are not proportionate to mass ratio of EDTA-RGO to loaded Pt-NPs. A possible explanation is that the Pt-NPs on the EDTA-RGO surface may have been divided into two groups as the density of Pt-NPs on the surface increases. One group contains all Pt-NPs that can interact with EDTA groups directly (Binding-groups), while the other group has Pt-NPs that have no interaction with EDTA-groups (Non-Binding groups). With more and more Pt-NPs deposited onto the EDTA-RGO surface, the EDTA-sites are taken by Pt-NPs. The later formed Pt-NPs will deposit onto the graphene surface directly. These Pt-NPs cannot be protected by EDTA groups and exhibit less tolerance toward CO poisoning. The more Pt-NPs deposited on the EDTA-RGO surface, the lower ratio of binding-Pt-NPs and, hence, the lower tolerance towards CO poisoning. To obtain the best performance of EDTA-RGO support Pt-NPs catalysts for fuel cell applications, more work is needed to optimize the relationship with respect to the stability of EDTA-RGO/Pt-NPs, and the surface density of EDTA groups and loaded Pt-NPs on the EDTA-RGO surface.

Example 11

One application of EDTA-GO is for uses in environmental protection. Ethylenediaminetetraacetic acid (EDTA) is well known for forming stable chelates with metal ions. Therefore, it can be ideally used for metal removal. Immobilization of EDTA on different supporting materials for adsorption purposes has received widespread attention; substrate materials employed include silica gel[41], polymer resin, and cellulose.

The chemically functionalized graphene sheets with N-(trimethoxysilylpropyl) ethylenediamine triacetic acid via a silanization reaction is an ideal adsorbent for heavy metal removal (Madadrang, C. J. et al., 2012).

The capability of EDTA-GO to adsorb heavy metals was tested by mixing EDTA-Graphene with lead solutions. Since lead is one of the most abundant heavy metals present in the aqueous environment, the higher capacity of EDTA-GO for the removal of lead was observed. In a typical experiment, EDTA-GO was mixed with water solution that contained various concentrations of lead. The following experiments were designed to investigate the adsorption behavior of Pb(II) on EDTA-GO surfaces and the potential applications of EDTA-GO for heavy metal removal. We found that Pb(II) concentration in Pb(II) contaminated water can be decreased to ~0.5 ppb or less after the treatment with EDTA-GO.

It is expected that there is a very stable complex formed between EDTA and Pb(II) ions and this contributes the properties of EDTA-Go necessary to entirely remove Pb(II) from water systems. Table 1 lists the removal results after various lower concentrations of Pb (II) solutions were treated with EDTA-GO. It can be seen clearly that the Pb(II) concentration in water reached a safe level after treated with EDTA-GO. The equilibrium concentration of Pb(II) was about 0.55 ppb, which is lower than the FDA drinking water standard level (10 ppb). The higher removal efficiency of Pb(II) is probably due to the higher stability constant of Pb(II)-EDTA complex (log K≈18.0). For a real filtration system, this is an ideal adsorbent because it can remove toxic heavy metals entirely.

TABLE 1

The removal efficiency of EDTA-GO towards Pb(II)

| | Initial concentration of P(II) (ppb) | | | | |
|---|---|---|---|---|---|
| Initial | 1.0 | 5.0 | 10.0 | 50.0 | 100.0 |
| | Equilibrium concentration of P(II) after treatment with EDTA-GO (ppb) | | | | |
| pH 6.5 | 0.64 | 0.8 | 0.73 | 1.74 | 5.65 |
| pH 6.8 | 0.44 | 0.68 | 0.87 | 1.82 | 5.21 |
| pH 7.2 | 0.57 | 0.64 | 0.73 | 2.94 | 4.14 |

EXAMPLE 12

Another typical adsorption experiment was performed with lead and other heavy metals. The experiment was performed by mixing 1~200 mg of EDTA-GO with 100 mL of an appropriate metal ion solution. The initial metal concentration was increased from 0.01 ppm to 5000 ppm, while pH values of all solutions were maintained at 2.5~10.5 with buffer solutions such as $NH_4Cl$—$NH_3$, NaAc-HAc and phosphorate Buffer. The solution was left over 1 to 64 hours and then the solution was filtered with 0.2 μm membrane; the filtered GO was tested with SEM EDAX. The solution was filtered and the adsorption capability was tested by utilizing Uv-vis with a Thermal Fisher Evolution 300 instrument, the inductively coupled plasma (ICP) and Atomic absorption spectrometer (AAS). The adsorption capacity qe (mg/g EDTA-GO) were obtained as follows: $qe=[(C_i-C_f)V/w]$; where $C_i$ and $C_f$ are the initial and final concentrations (mg/ml) of metal ion in the aqueous solution, respectively, V (ml) is the volume of metal ion solution and w (g) is the weight of EDTA-GO. The effects of pH on metal ion adsorption were measured with the same procedure but the buffer solutions were 3.0, 4.5, 5.5, 7.2 and 8.2. In all samples, the solutions treated with EDTA-GO were filtered through 0.2 μm ion-track membrane filters.

The sorbent capacities of our inventions are listed in Table 2, along with other materials that have been used as commercial products. In addition, Table 1 lists some capabilities of EDTA-GO to other heavy metals, such as Copper (II), Zinc (II), Mercury (II) et al. These tests were performed by mixing EDTA-GO with various heavy metals solutions and the testing data are shown in Table 2 below:

TABLE 2

The capacity of EDTA modified graphene oxide to absorb heavy metals as compared with regular resin

| Capacity mg/g | Lead | Cu | Cr | Cd | Co | Ni | Zn | Ca | Mg | Hg |
|---|---|---|---|---|---|---|---|---|---|---|
| Carbon nanotubes | ~60 | 15 | 30 | 7.5 | | | | | | |
| Activated Carbon Powder | 13~35 | 32 | | | | | | | | |
| Activated Carbon | | 31.4 | n/a | | | | | | | |
| Activated Carbon fiber | | | | 146 | | | | | | |
| Nano-oxide | | 12.6 | 13.1 | 8.3 | | | | | | |
| Resin | 250 | 42 | | | | 20 | 96 | | | |
| Polyvinyl benzene | 20 | 52 | | 42 | 90.6 | 25 | 6 | 4 | | 440 |
| polyacrylonitrile | | 180 | 18.1 | | 10.83 | 21.53 | | | | |
| PVA | 20 | 555 | | | 300 | 123 | | | | 176 |
| Starch Resin | 360 | 68 | | | | | | | | |
| Fiber Resin | 334 | 150 | | 149 | | 184 | | | | 288 |
| Chitin | 220 | 150 | 16 | 180 | | 35 | | | | 435 |
| Graphene oxide | 300~ | 26 | | | | 53 | | 81 | 73 | |
| EDTA-Graphene oxide | 500~800 | 80 | | 240 | | 134 | | 140 | 70 | 1060. |
| Resin for water soften | n/a | n/a | n/a | n/a | n/a | | | 60~100 | | |

EXAMPLE 13

Another application of EDTA-GO is for making fuel cells. Because of their high chemical stability and a large surface to volume ratio, GO and its derivatives can be considered as catalyst support materials. Many researchers have focused on the application of graphene in fuel cells as catalyst supports and demonstrated that graphene can be used as catalyst supports where catalytically active metal particles, such as Pt, Ru, Pt, and Ru, may be loaded by graphene surface groups and the metal nanoparticles displayed good catalytic behavior toward the oxidation of methanol.

In a typical process, 0.1 mg~1 g of EDTA-GO powder was dispersed in 1~100 ml of ethylene glycol (EG) solution and sonicated for 5~30 min. An aliquot (1.5 ml) of hexachloroplatinic acid ($H_2PtCl_6$, Sigma-Aldrich) EG solution (7.4 mg $H_2PtCl_6$/ml EG) was added into the graphene oxide solution and mechanically stirred for 2 hours. Sodium hydroxide (2.5M in EG solution) was added to adjust the pH of the solution to 13.0, and then the solution was fluxed under flowing argon at 130° C. for 3 hours. The solid was filtered, washed with DI water, and dried in an oven at 80° C. for 12 hours.

For the synthesis of graphene-supported Pt—Ru catalysts, the only difference was to add 1.5 ml of EG solution, including both $H_2PtCl_6$ and ruthenium chloride ($RuCl_3$, Sigma-Aldrich) (7.4 mg $H_2PtCl_6$ and 7.4 mg $RuCl_3$ per ml of EG), into the graphene oxide solution.

To evaluate the activity of methanol electrooxidation, the electrocatalytic activities of EDTA-GO/Pt catalysts in methanol oxidation were investigated by cyclic voltammetry (CV) in an electrolyte of 1.0 M $H_2SO_4$ containing 0.5 M $CH_3OH$ at 60 mV/s. FIG. 12 shows the CV results of EDTA-GO/Pt electrocatalysts after 20 cycles of electrooxidation of methanol. Typical feature of methanol oxidation is observed: two oxidation peaks, corresponding to the oxidation of methanol and intermediates, occurred at 0.67V and 0.42V, respectively. From the cyclic voltammetry, the ratio of the forward anodic peak current ($I_f$) to the reverse anodic peak current ($I_b$) is a critical parameter. Basically, a high $I_f/I_b$ value indicates a relatively complete oxidation of methanol, thus producing carbon dioxide. In other words, this ratio is the description of electrocatalyst tolerance to the accumulation of carbonaceous species. It can be observed from FIG. 10 that the EDTA-GO/Pt catalyst shows the $I_f/I_b$ value of 2.45 after 20 cycles, which is much higher than the GO/Pt catalyst ($I_f/I_b$ value: 0.73~1.26)

and CNTs/Pt catalyst (0.5~1.2). Such high value indicates that most of the intermediate carbonaceous species were oxidized to carbon dioxide in the forward scan of the EDTA-GO/Pt electrocatalyst. These results demonstrate that the EDTA-GO/Pt catalyst possesses the highest capability in oxidizing methanol electrochemically. Some studies have demonstrated that that the bimetallic alloy catalysts have heterogeneous phases, affecting the electrochemical activity. It was also demonstrated that the poisoning of Pt nanoparticle by CO can be declined acidic environment and Pt on $WO_3$ surface show very high $I_f/I_b$ ratio. The presence of EDTA on graphene surfaces can dramatically enhance the activity and stability of Pt. In this study, the $I_f/I_b$ of EDTA-GO/Pt is 2~2.5, which is much higher than that of GO/Pt and CNT/Pt (0.73~1.3), exhibited the best electrocatalytic activity.

EXAMPLE 14

Compounds of the formula $R-(CH_2)_m-Si-X_3-$ were used for coating graphene oxide, wherein X and R are as defined above. X refers the functional groups that will be involved in the reaction with the graphene oxide. The bond between X and the silicon atom in coupling agents is replaced by a bond between the graphene oxide and the silicon atom. Generally, X is a hydrolyzable group: alkoxy, acyloxy, amine, or chlorine. The most common alkoxy groups are methoxy and ethoxy, which give methanol and ethanol as byproducts during coupling reactions.

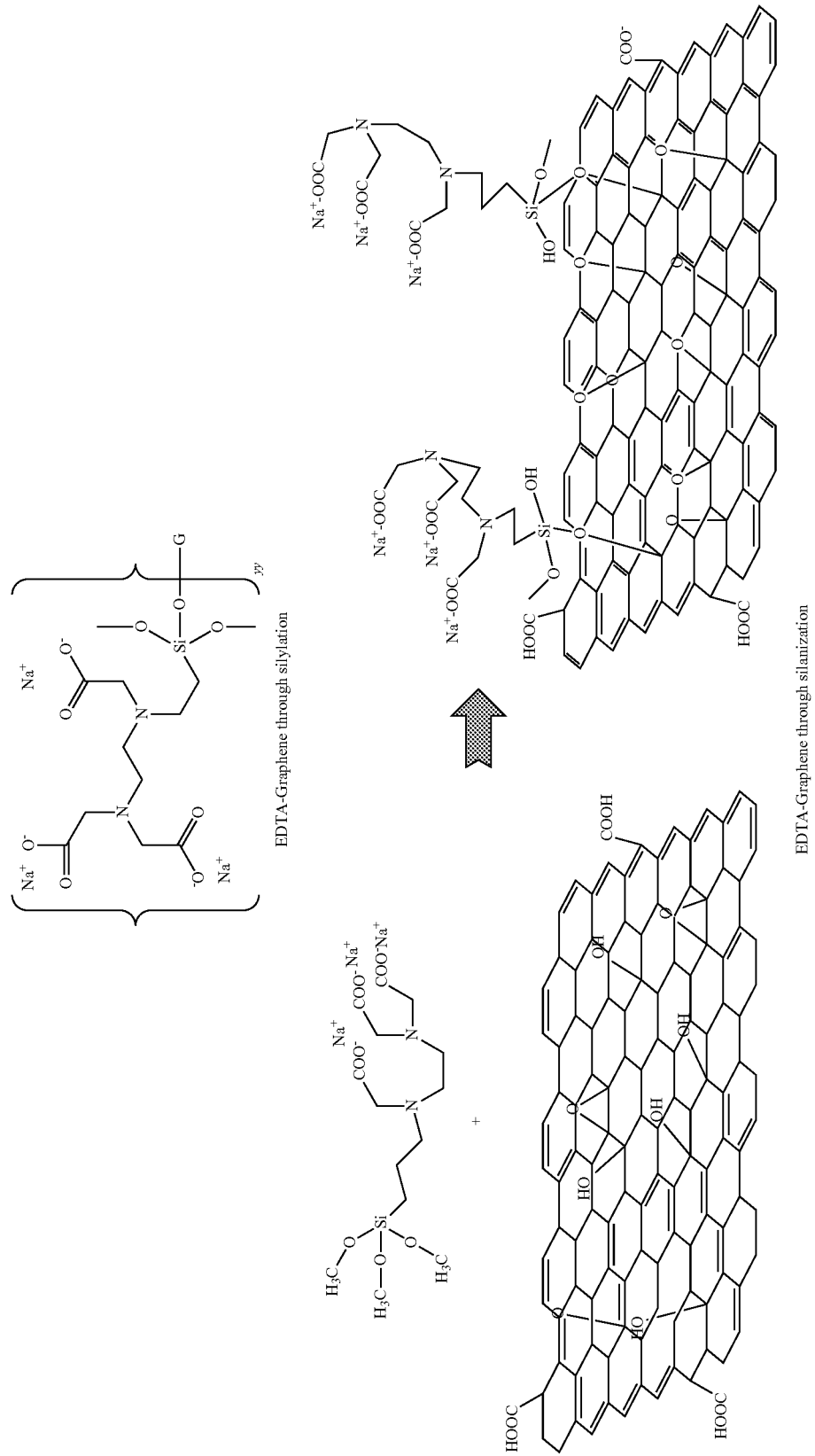

The properties of ethylenediamine triacetic acid (EDTA) modified graphene, a water soluble group, can enhance the solubility of graphene in DI water. This result should facilitate the preparation of graphene derivatives or the development of graphene-based hybrid materials.

EXAMPLE 15

The silane agent of example 10 is replaced with ethylenediaminotriacetatic acid, nitrilodiacetaic acid, diethylenetriamine tetraacetate and ethylene glycol triacetaic acid to make the corresponding chelating agent modified graphene oxides.

EXAMPLE 16

Graphene oxide can be activated by the following reaction.

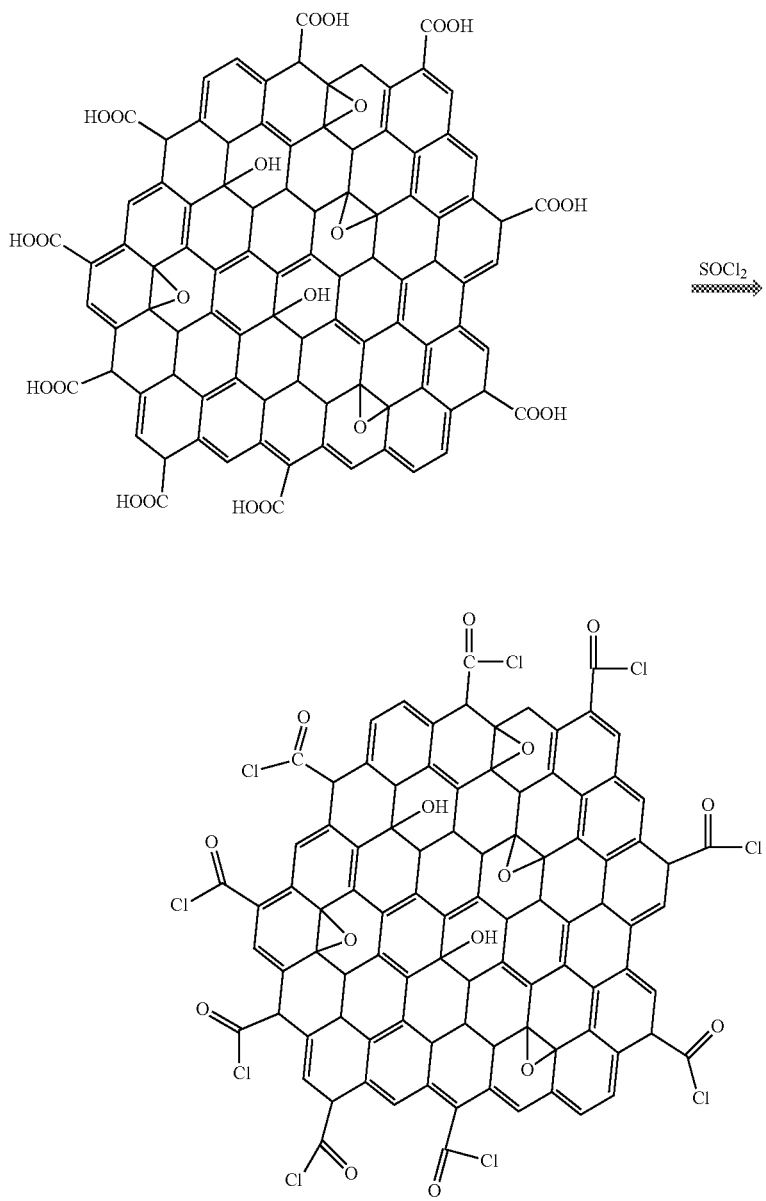

EXAMPLE 17

Chelating agent modified graphene oxides are synthesized by the following reactions:

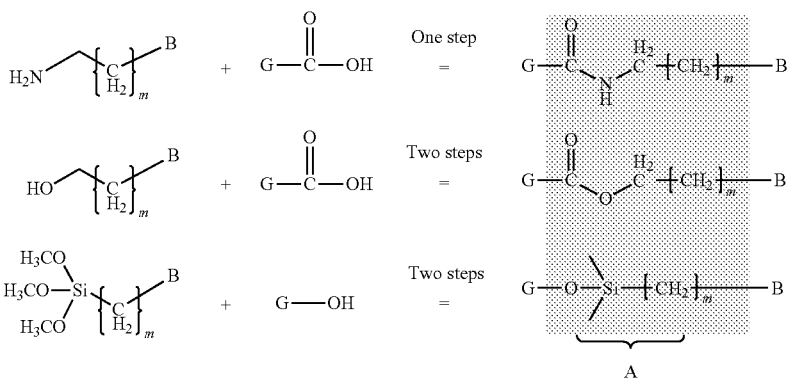

wherein G is graphene oxide and B is a chelating moiety; wherein X is $-OR^1$; wherein $R^1$ is H, or $C_1$-$C_{12}$ alkyl; wherein m is 1-12.

EXAMPLE 18

A chemical modification process was developed to functionalize reduced graphene oxide with specific groups N-(trimethoxysilylpropyl) ethylenediamine triacetic acid (EDTA). EDTA were linked to single-layer graphene sheets through covalent bond and could be dispersed in water, tetrahydrofuran, and ethylene glycol, with individual, single-layer graphene sheets automatically. And this novel material predicted applications in various areas.

EXAMPLE 19

A method was developed for the synthesis of novel graphene derivatives using organic synthesis techniques through Silane agents and amide groups and its related applications. The starting materials include graphene, graphite oxide, or reduced graphene oxide with any kind of single to multi-layer carbon sheets from graphite with thicknesses from 0.1 nm to 0.1 mm, and sizes from 10 nm to 1 cm. and the functional groups with EDTA and other chelating groups.

The functional groups, EDTA or chelating agents or chelants, usually are organic compounds, and chelants, chelators, chelating agents, or sequestering agents, refer to chemicals that form soluble, complex molecules with certain metal ions, inactivating the ions so that they cannot normally react with other elements or ions to produce precipitates. These groups can form in the presence of two or more separate bindings between a polydentate (multiple bonded) ligand and a single central atom. The ligand forms a chelate complex with the substrate. Chelate complexes are contrasted with coordination complexes with monodentate ligands, which form only one bond with the central atom.

Figure 1:
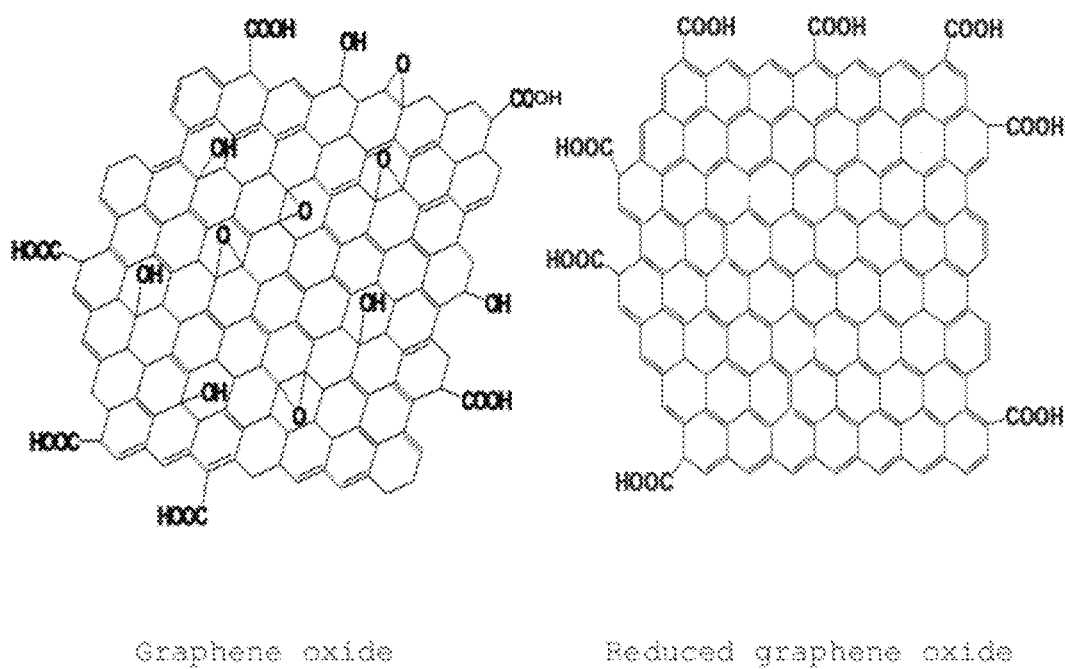
FIG. 1 shows the general structure of graphene oxide and reduced graphene oxide.
Figure 3:
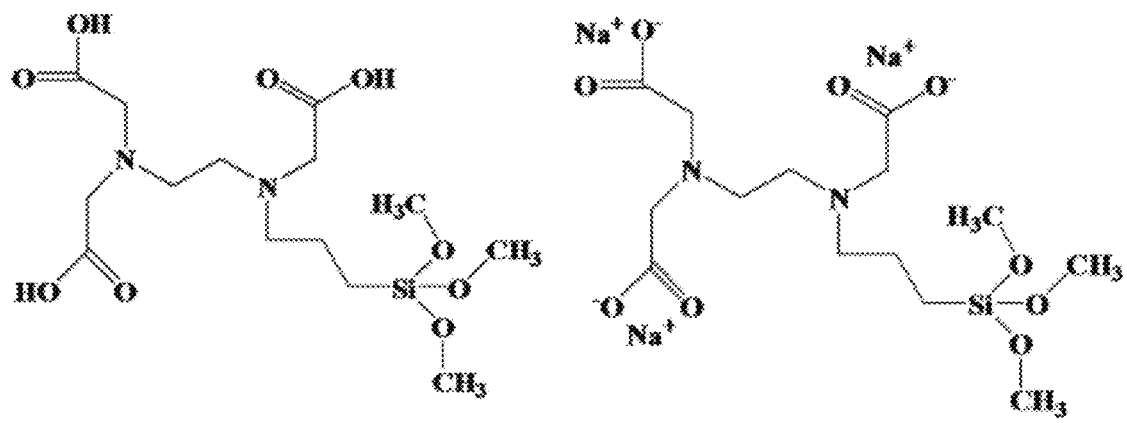
FIG. 3 shows (EDTA-silane): N-(tri-methoxy-silylpropyl) ethylene-diamine triacetic acid structure and N-(tri-methoxy-silylpropyl) ethylene-diamine triacetic acid tri-sodium salts structure. Both of these two materials are named as EDTA-silane.
Figure 5:
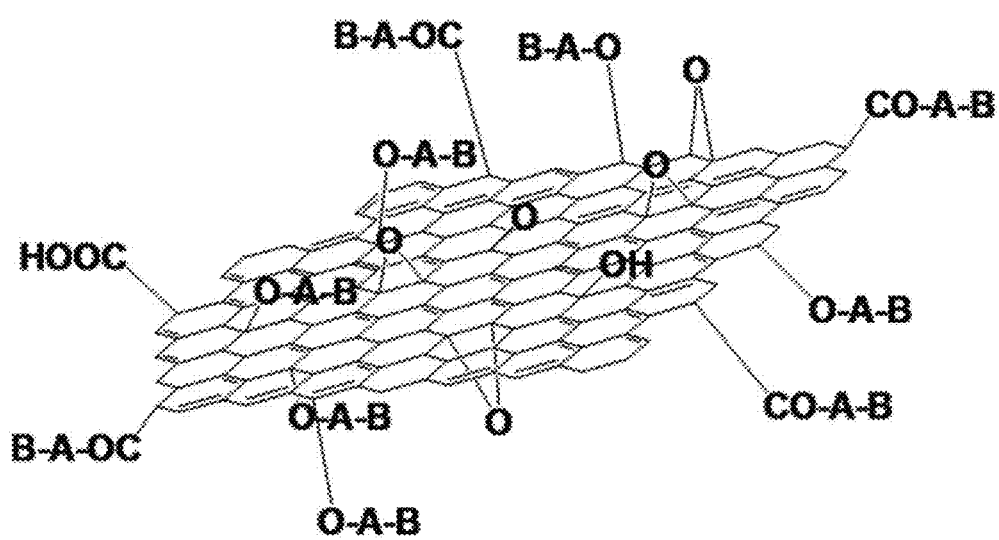
FIG. 5 shows an example of a structure for chelating agent modified graphene oxide.

The chemical technique to link EDTA to the graphene surface through a silanization process is depicted in FIGS. 1 and 2. The novel molecules or materials of the present invention, depending upon the characteristics and properties of natural graphene, graphene oxide and reduced graphene oxide (RGO), its conductivity, et al. and the chemical and physical properties of EDTA groups, are useful as novel nanomaterials for the microelectronic, super-capacitor electrode materials, fuel cell electrode materials, solar cell electrode materials, catalysis materials for any chemical engineering materials, extraction or separation for batteries, membrane filtration, extraction and other potential applications. In addition, dispersion of this material with polymers to fabricate polymer composites are also included.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art, without departing from the spirit of the invention.

REFERENCES

1. Park, Sungjin and Ruoff, Rodney s., 2009, "Chemical methods for the production of graphenes," Nature Nanotechnology, 4(4): 217-24.
2. Sharma, S., Ganguly, A., Papakonstantinou, P., Miao, X. P., Li, M. X., Hutchison, J. L., Delichatsios, M., Ukleja, S., 2010, "Rapid Microwave Synthesis of CO Tolerant Reduced Graphene Oxide-Supported Platinum Electrocatalysts for Oxidation of Methanol," Journal of Physical Chemistry C, 114: 19459-19466.
3. Liu, J. M., Meng, H., Li, J. I., Liao, S. J., and Bu, J. H., 2007, "Preparation of high performance Pt/CNT catalysts stabilized by ethylenediaminetetraacetic acid disodium salt," Fuel Cell 7: 402-407.
4. Madadrang, C. J., Kim, H. Y., Gao, G., Wang, N., Zhu, J., Feng, H., Gorring, M., Kasner, M. L., and Hou, S., 2012, "Adsorption Behavior of EDTA-Graphene Oxide for Pb (II) Removal," ACS Appl. Mater. Interfaces, 4(3): 1186-1193.

What is claimed is:

1. A chelating agent modified graphene oxide having the following formula:

$$G(AB)_x$$

wherein G is graphene oxide;
wherein A is a linking moiety selected from the group consisting of $-(CH_2)_m-$, $-NH-$, $-S-$, $-O-S_i(-OR^1)_2(-CH_2)_m-$, $-C(=O)-$, $-C(=O)-O-$, $-C(=O)-O(CH_2)_m-$, $-C(=O)-NH-$, $-C(=O)-NH-(CH_2)_m-$, $-P(=O)_2-O-$;
wherein m is 1-12 and $R^1$ is H, or $C_1$-$C_{12}$ alkyl;
wherein B is a chelating moiety;
wherein the ratio of basic graphene oxide units:x is from about 1:0.00001 to about 1:0.5.

2. The chelating agent modified graphene oxide of claim 1, wherein said graphene oxide contains functional groups $-COOH$, $-OH$ and $-O-$.

3. The chelating agent modified graphene oxide of claim 1, wherein said graphene oxide contains functional groups —COOH, or —OH.

4. The chelating agent modified graphene oxide of claim 1, wherein said ratio of basic graphene oxide units:x is from about 1:0.00001 to about 1:0.04.

5. The chelating agent modified graphene oxide of claim 1, wherein said linking moiety is —O—S$_t$(—OR$^1$)$_2$ (—CH$_2$)$_m$—; wherein R$^1$ is H, or C$_1$-C$_{12}$ alkyl, m=1-12.

6. The chelating agent modified graphene oxide of claim 5, wherein said R$^1$ is H or C$_1$-C$_4$ alkyl.

7. The chelating agent modified graphene oxide of claim 1, wherein said chelating moiety is selected from the group consisting of:

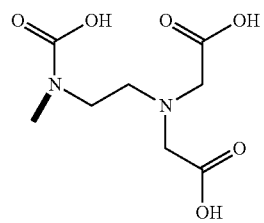
ethylene diamine triacetic acid

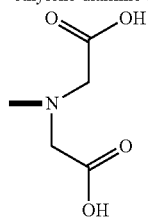
Nitrilo-diacetic acid

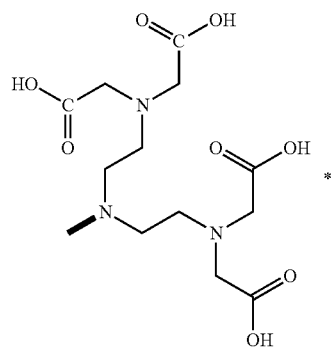
Diethylene triamine tetra acetic acid

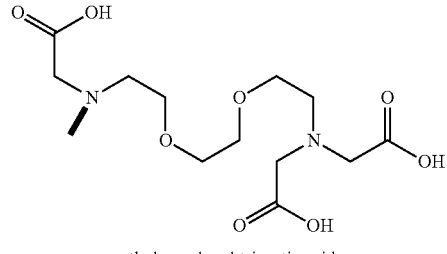
ethylene glycol triacetic acid or their salts.

8. The chelating agent modified graphene oxide of claim 7, wherein said m is 1-4.

9. The chelating agent modified graphene oxide of claim 7, wherein said chelating moiety is ethylene diamine triacetic acid or its salts and A is —(CH$_2$)$_m$— and wherein m is 1-12.

10. A process of synthesizing chelating agent modified graphene oxide comprising the step of:

Reacting graphene oxide with a silane agent selected from the group consisting of

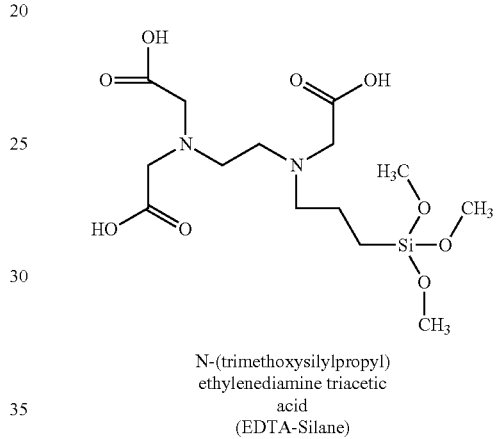
N-(trimethoxysilylpropyl) ethylenediamine triacetic acid (EDTA-Silane)

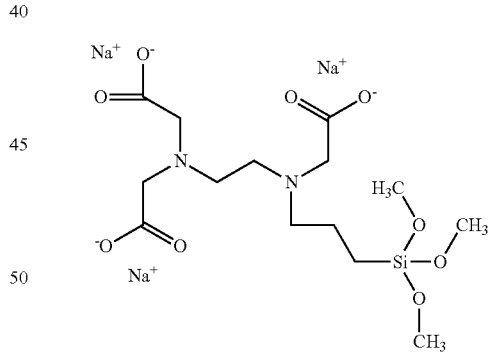
N-(trimethoxysilylpropyl) ethylenediamine triacetic acid tri sodium salt (EDTA-Silane)

wherein the reaction proceeds as follows:

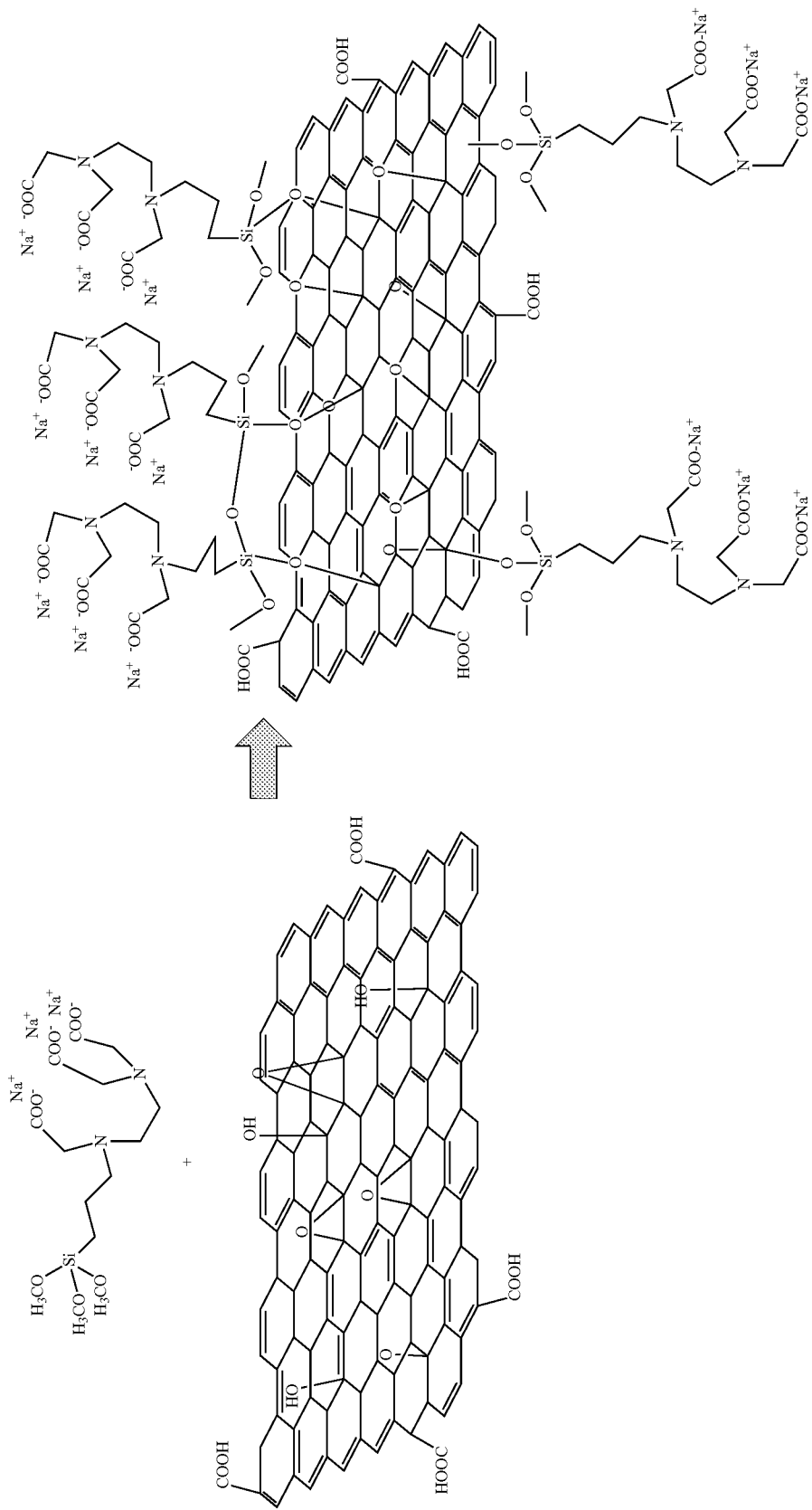

Wherein the ratio of the basic graphene oxide unit: N-(trimethyoxypropyl)ethylenediamine triacetic acid or N-(trimethoxysilylpropyl)ethylenediamine triacetic acid trisodium salt is from about 1:0.00001 to about 1:0.5 in the product.

11. A process of synthesizing chelating agent modified graphene oxide, comprising the steps of:
   (i) optionally treating graphene oxide with $SOCl_2$ or $SOBr_2$ to convert the carboxyl groups on the surface of said graphene oxide to corresponding —C(=O)Cl groups or —C(=O)Br groups;
   (ii) reacting said graphene oxide from step (i) with AB to produce said chelating agent modified graphene oxide;
   wherein —B is a chelating moiety and A is selected from the group consisting of HO—$(CH_2)_m$—, H—NH—, H—S—, $R^1$—O—$S_i$(—$OR^1$)$_2$(—$CH_2$)$_m$—, HO—C(=O)—, HO—C(=O)—O—, HO—C(=O)—O—$(CH_2)_m$—, HO—C(=O)—NH—, HO—C(=O)—NH—$(CH_2)_m$—, and HO—P(=O)$_2$—O—;
   wherein m is 1-12 and $R^1$ is H, $C_1$-$C_{12}$ alkyl.

12. The process of claim 11, wherein A is HO—$(CH_2)_m$— and wherein m is from 1-12, and wherein B is selected from the group consisting of ethylene diamine triacetic acid, diethylene triamine tetra acetic acid, nitrilo-diacetic acid, ethyleneglycol tri-acetic acid, and diethylene triamine, or their salts wherein the ratio of basic graphene oxide unit:ethylene diamine triacetic acid, diethylene triamine tetra acetic acid, nitrilo-diacetic acid, ethyleneglycol tri-acetic acid or diethylene triamine is from about 1:0.00001 to about 1:0.5 in the product.

13. The process of claim 11, wherein said m is 1-4.

14. The process of claim 11, wherein said AB is N-(trimethoxysilylpropyl)ethylenediamine triacetic acid or its salt.

15. A method of using chelating agent modified graphene oxide of claim 1 to produce metal catalysts, comprising the steps of:
   (i) solubilizing or dispersing said chelating agent modified graphene oxide in aqueous or organic solvent;
   (ii) adding to the solution or suspension in step (i) a salt of the metal selected from the group of salts of Ni, Co, Fe, Pt, Ru, Au, Cr, Cu, Mg, Mn, Mo, Rh, Si, Ta, Ti, W, U, V, Zr, or Li to form a metal complex; and
   (iii) precipitating metal complex of said chelating agent modified graphene oxide from step (ii) to produce micro particles or nano particles of said metal nanoparticles for use as catalyst.

16. The method of claim 15, wherein said EDTA-Graphene oxide said micro particles or nano particles, is used as fuel cell catalysts.

17. A method of using chelating agent modified graphene oxide of claim 1 to remove metal ions from water, comprising the steps of:
   (i) placing said chelating agent modified graphene oxide into filtration device;
   (ii) passing metal-ion-containing-water through said filtration device to remove metal ions.

18. The method of claim 17, wherein said metal ion is selected from the group consisting of Ni, Hg, Cd, Co, Fe, Pt, Ru, Au, Cr, Cu, Mg, Mn, Mo, Rh, Si, Ta, Ti, W, U, V, Zr and Li.

19. The method of claim 17, wherein the removal of metal ions is for producing drinking water.

20. The method of claim 17, wherein the removal of metal ions is for extraction of metals.

21. The method of claim 17, wherein the removal of metal ions is for environmental remediation.

22. A method of using chelating agent modified graphene oxide of claim 1 to produce high capacity performance lithium ion battery, comprising the step of replacing all other carbon materials in lithium ion battery with said chelating agent modified graphene oxide to produce said high performance energy battery.

* * * * *